United States Patent [19]

Martin

[11] 4,389,885

[45] Jun. 28, 1983

[54] SIGNAL GENERATOR FOR A PENETRATION RATE MEASURING APPARATUS

[75] Inventor: T. Edward Martin, Oklahoma City, Okla.

[73] Assignee: Arthur J. Connelly, Farmington, N. Mex.

[21] Appl. No.: 248,957

[22] Filed: Mar. 30, 1981

[51] Int. Cl.³ .............................................. E21B 45/00
[52] U.S. Cl. .................................. 73/151.5; 33/141 E; 33/141.5
[58] Field of Search .......................... 73/151.5; 367/33; 33/129, 141.5, 141 R, 141 E, 141 D

[56] References Cited

U.S. PATENT DOCUMENTS

| | | | |
|---|---|---|---|
| 3,916,684 | 11/1975 | Rundell | 73/151.5 |
| 4,099,410 | 7/1978 | Martin | 73/151.5 |
| 4,179,817 | 12/1979 | Lavigne | 33/141 R |

FOREIGN PATENT DOCUMENTS 687228 10/1979 U.S.S.R. ............................... 73/151.5

Primary Examiner—Howard A. Birmiel
Attorney, Agent, or Firm—Dunlap & Codding

[57] ABSTRACT

To measure the penetration rate of a drill string, a signal generator includes a friction wheel that can be engaged with the side of a drum upon which is wrapped a cable used to lower the drill string by turning the drum. The friction wheel is mechanically coupled to a cam which operates a pneumatic switch each time the cam rotates to produce depth indicator signals that are transmitted to a recording system, including a moving strip chart record, to record increments of penetration. The signal generator further includes a first pneumatic counter which counts pneumatic pulses from the switch beginning with the first pulse after addition of a segment of pipe to the upper end of the drill string. The first pneumatic counter transmits pneumatic pressure to a pneumatic actuating cylinder to shift the friction wheel radially inwardly of the drum when the number of pulses corresponds to a number of increments of penetration caused by unwrapping the outermost lap of cable from the drum. A second pneumatic counter counts pneumatic pulses from the switch subsequent to such shift and relieves the pressure transmitted to the pneumatic actuating cylinder, so as to return the friction wheel to its initial position, when the total number of pulses counted by both counters corresponds to a number of increments of penetration in the length of one segment of drill pipe making up the drill string.

11 Claims, 13 Drawing Figures

SIGNAL GENERATOR FOR A PENETRATION RATE MEASURING APPARATUS

BACKGROUND OF THE INVENTION

The present invention relates generally to apparatus for monitoring the penetration of a drill string into the earth during oil well drilling operations and, more particularly, but not by way of limitation, to apparatus for generating depth marker signals as drilling proceeds.

2. Brief description of the Prior Art

In the drilling of an oil well, the drill bit is mounted on the lower end of a drill string which is suspended from a drilling swivel, the drilling swivel, in turn, being suspended from a crown block at the top of the drilling rig so that the drilling swivel is lowered as the well is drilled. Such lowering of the drilling swivel is accomplished by paying out cable from a drum, such cable passing about sheaves on the crown block and drilling swivel to an anchor which fixes one end of the cable. The drilling proceeds in stages in each of which the drill string is lengthened by adding a segment of drill pipe to the upper end of the string and, thereafter, lowered to cause the drill bit to penetrate the earth an additional depth equal to the length of the added pipe segment. Specifically, in each stage, the drum is operated to raise the drilling swivel while the drill string is supported by the rotary table of the drilling rig; a new segment of the pipe is attached to the drilling swivel and connected to the upper end of the drill string; and the drum is then rotated, during drilling, to lower the drilling swivel and drill string. Thus, the drilling swivel undergoes repetitive vertical reciprications and the drum, similarly, undergoes corresponding, repetitive rotational reciprocations with the result that the depth of the well is incresed by the length of one segment of drill pipe in each reciprocation of the drilling swivel and drum.

It is common practice in the drilling of a well to monitor the rate at which the depth of the well increases and there are a variety of reasons for doing so. For example, should the drill string break, such fact will be indicated by a sudden decrease in the penetration rate. Similarly, changes in the penetration rate can be used to identify various strata where a well is drilled into a known geological formation so that, for example, the depth of such strata, at the well being drilled, can be determined. Similarly, penetration provides a qualitative measure of the state of wear of the drill bit.

A convenient way of monitoring the rate of penetration is to equip the well with a recorder having a steadily moving chart and provide a device which will mark the chart each time the depth of the well increses by some chosen increment of depth; for example, an increment of one foot. The spacings of the marks on different portions of the chart then indicate the relative rates of penetration for different depths into the well. A device which is particularly well-suited for making a record of the penetration of a drill string has been described in my U.S. Pat. No. 4,099,410 issued July 11, 1978. Such device has an input shaft which can be coupled to the drilling swivel by conventional means such that the input shaft will turn through one revolution as the drilling swivel is lowered through the selected depth increment. The device also includes a sensor assembly which generates a pneumatic signal each time the input shaft turns through one revolution and a control circuit which receives the pneumatic signals generated by the sensor assembly and converts such signals into mechanical movements of a rod which can be attached to the pen of a strip chart recorder.

It will be recognized that the length of drill string hoisting cable paid out by the drum in each rotational reciprocation thereof also provides a measure of drill string penetration and there are advantages to be obtained in operating a device, such as that disclosed in my aforementioned U.S. Pat. No. 4,099,410, from movements of the cable. For example, since the cable extends to the drum which is placed beside the derrick of a drilling rig, so that there is no need for any portion of the penetration rate recording system to be located on the derrick, the connection of such recording system to the drilling rig can be simplified and possible entanglement of cables, pneumatic tubing and the like, forming a part of the system, can be largely avoided. However, attempts to use movement of the drill string hoisting cable as a measure of the movement of the drill string encounter serious difficulties. The cable is subject to whipping movements so that attachment of a sensor to the cable can be a severe problem. While this problem can be overcome by coupling the system to the drum upon which the cable is wrapped, so that angles of rotation of the drum are used as measures of drill bit penetration, such coupling has, in the past, given rise to another problem. The cable is wrapped on the drum in laps and, as a practical matter, it often occurs that portions of two laps will be paid out from the drum as the drill string is lowered through a distance equal to the length of a pipe segment. Since these laps will have different diameters, the relationship between angles through which the drum turns and distances the drill string is lowered will vary from lap to lap. As a result, successive marks made on a chart by a device interposed between the drum and a recorder will sometimes correspond to one penetration distance and, at other times, correspond to a different penetration distance so that the chart may very well be misinterpreted. At the very least, the chart would become difficult to interpret.

SUMMARY OF THE INVENTION

The present invention is an apparatus for generating depth indicator signals, suitable for use in making a penetration rate record, which provides the advantages of using rotation of the drum as a means for measuring penetration of a drill string while minimizing problems in the interpretation of charts on which increments of penetration are recorded. Specifically, the present invention provides a signal generator for a penetration rate measuring apparatus which includes a friction wheel engageable with the side of a drill string hoisting cable drum and a means for shifting the position of the friction wheel on the drum when the outermost lap of such cable is paid out from the drum so that, while the relationship between angles of rotation of the drum and penetration depth increments changes from one lap of cable on the drum to another, angles of rotation of the friction wheel will bear a substantially constant relationship to depth increments. The friction wheel is thus used to drive a signal production assembly that will provide a depth indicator signal each time the friction wheel turns through a pre-selected angle and each such signal will substantially correspond to one unit of penetration of the drill bit.

It is contemplated that the present invention will be used with a device, such as the control assembly described in my aforementioned U.S. Pat. No. 4,099,410, for making a record of the depth indicator signals. As described in that patent, such control assembly is constructed to receive pneumatic pulses and, in response to each pulse, to move a pen on a strip chart recorder so as to make a mark on the chart of the recorder corresponding to the pulse. Correspondingly, in the preferred embodiment of the signal generator of the present invention, a signal production assembly of which it is comprised provides the depth indicator signals in the form of pneumatic pulses which are supplied to the control assembly. In order that each pulse indicate one standard unit of penetration of the drill bit, independently of the lap from which cable on the drum is paid out to advance the drill string, the friction wheel is supported adjacent the side of the drum so that the friction wheel can be moved radially of the axis of the drum. Such movement is effected by counting the depth indicator signals that are produced by the signal production assembly connected to the friction wheel and providing means for shifting the friction wheel radially inwardly of the drum when the count reaches a number equal to the number of unit penetration increments through which the drill string will be lowered by paying out the outermost lap of cable on the drum. Following such shift, the counting continues until the total count is equal to the number of unit penetration increments in the nominal length of the drill pipe used to make up the drill string. At this count, the friction wheel is returned to its original position on the drum in preparation for counting penetration increments after an additional segment of pipe has been added to the drill string. Thus, as each new segment of pipe is added to the drill string, and the drill string is lowered so that the depth of the well is increased by the length of the segment added, the present invention will provide a series of depth indicator signals which each indicate an additional penetration of one selected unit of distance.

It should be noted that drill pipe segments, while manufactured to a nominal length, will occasionally have a length other than such nominal length due to changes made to the length of the pipe in the field. Thus, the shifting of the friction wheel will not always occur just as the outermost lap of cable is paid off the drum and just as the lowering of the drill string, after the addition of new segment, commences so that an occasional mark will be misplaced on a chart made of penetration versus time. (Similarly, the transition between laps of cable on the drum is not sharply defined so that a mark can similarly be misplaced because of this factor.) As a practical matter, such misplacement will have little effect on the interpretation of the chart because it is the overall pattern of marks on the chart which is of interest so that an occasional misplacement of a mark will be of little consequence. Other marks, adjacent the misplaced mark, will each indicate a depth incrememt equal to the preselected unit of penetration and will be accurately spaced so that the error in the placement of the misplaced mark will be clearly indicated by the series of accurately spaced marks to either side thereof. Moreover, since length variations in drill pipe segments are essentially random, errors in placement of marks on the chart will not aggregate so as to produce a systematic error in recording of penetration depth versus time for a well.

An important object of the present invention is to facilitate the coupling of a drill string rate of penetration measuring apparatus to a drill string forming a part of an oil well drilling rig.

Another object of the invention is to eliminate the use of cables, tubes and the like strung on the derrick of a drilling rig in coupling a rate of penetration measuring apparatus to a drill string.

Still a further object of the invention is to provide a rate of penetration measuring apparatus which can be connected to a drill string cable hoisting drum, for measuring the rate of penetration of the drill string, without introducing unacceptable errors in the recordation of the penetration rate at which the well is drilled.

Other objects, advantages and features of the present invention will become clear from the following detailed description of preferred embodiments of the invention when read in conjunction with the drawings and appended claims.

DESCRIPTION OF FIGS. 1 THROUGH 5

Figure 1:
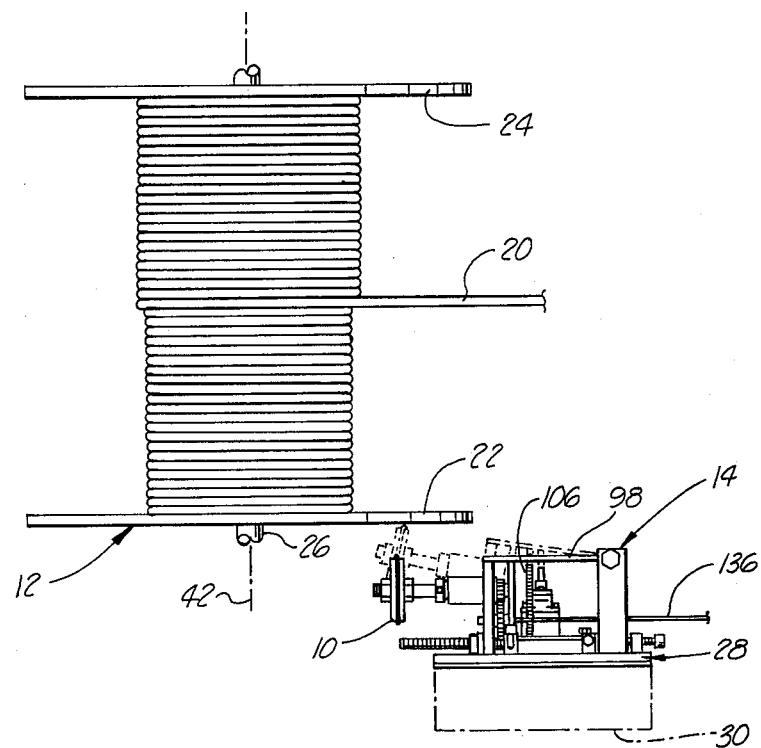
FIG. 1 is a plan view of a preferred embodiment of the friction wheel support assembly forming a portion of the shift assembly of the penetration rate measuring apparatus of the present invention and FIG. 1 shows a representative manner of mounting the friction wheel support assembly adjacent the drill string cable hoisting drum of a drilling rig.

For purposes of description, it is convenient to treat the signal generator of the present invention in terms of three operational groups (1) a friction wheel 10 which can be engaged with one side of the drill string cable hoisting drum 12 as shown in FIG. 1; (2) a shift assembly which, in turn, comprises a friction wheel support assembly 14 shown in FIGS. 1 through 5 and a pneumatic control circuit which is herein shown in two embodiments, designated 16 and 16a, in FIGS. 12 and 13 respectively; and (3) a signal production assembly which is similarly shown herein in two embodiments, one embodiment being shown in FIGS. 6 through 10 and designated therein by the general reference numeral 18 and the other embodiment being shown, in part, in FIG. 11 and designated by the numeral 18a therein.

Referring first to FIG. 1, the drum 12 shown therein is of conventional construction, such drum comprising a cylindrical body (not shown) about which a drill string hoisting cable 20 is wrapped, and two circular sides 22, 24 which are disposed at the ends of the body of the drum. The drum 12 is fixed to a shaft 26, which is concentric with the body of the drum and the sides 22, 24 thereof, and the shaft is supported by a conventional structure (not shown) which includes a motor (not shown) for turning the shaft 26 so as to pay out the cable 20 from the drum 12 or take up the cable 20 onto the drum 12. As is conventional in the art, the cable 20 extends to a sheave on the crown block of a drilling derrick, thence to a sheave on the drilling swivel, back to a second sheave on the crown block and, finally, to an anchor. Thus, the drilling swivel can be raised or lowered by taking up or paying out, respectively, the cable 20 onto or from the drum 12. It is also conventional to provide the crown block and drilling swivel with additional sheaves so that the cable 20 can be passed back and forth between the crown block and drilling swivel in a plurality of loops to provide a mechanical advantage in the connection between the crown block and drilling swivel and, as will be discussed below, it is contemplated that the present invention will be used during well drilling operations in which such mechanical advantage is, at times, employed.

Figure 2:
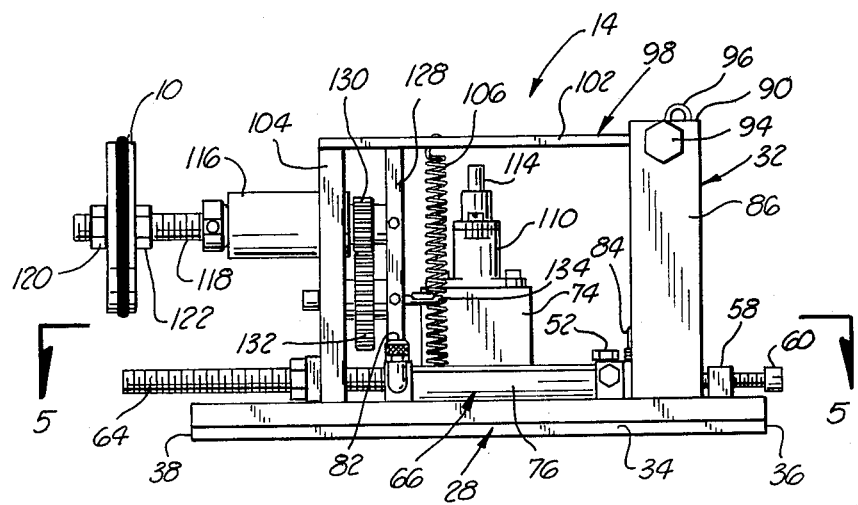
FIG. 2 is an enlarged plan view of the friction wheel support assembly shown in FIG. 1.

The friction wheel 10 is supported adjacent one side of the drum 12 by the friction wheel support assembly 14, the construction of which is shown in FIGS. 2 through 5. With particular reference to FIG. 2, the friction wheel support assembly 14 generally comprises a base 28, which can be mounted to one side of the drum 12 on any suitable supporting structure 30 as indicated in phantom lines in FIG. 1, and a friction wheel mount 32 which is slidable on the base 28. (The position of the friction wheel support assembly 14 relative to the drum 12 in FIG. 1 has been drawn for a representative case. As will be clear from the discussion to follow, the friction wheel support assembly 14 can be placed in any location which will permit the friction wheel 10 to be engaged, as will be discussed below, with either the interior or exterior surface of either of the sides 22, 24 at the drum 12.) More particularly, the base 28 comprises a flat plate 34 having opposed first and second ends, 36 and 38 respectively, such ends forming first and second ends for the base 28. The plate 34 is positioned on the supporting structure 30 such that one side 48 of the plate faces a side of the drum 12 and a center line of the plate 34, indicated at 40 in FIG. 5 and extending between the ends of the plate 34, extends radially from the axis of rotation 42 of the drum 12 (see FIG. 1). The base 28 further comprises two guides 44, 46 which are more particularly shown in FIGS. 4 and 5. The guides 44, 46 are mounted on the side 48 of the plate 34 that faces the side of the drum 12 and are disposed in a symmetric, parallel relation to the center line 40 to either side thereof. Each of the guides has an L-shaped cross-section and one leg of each guide, 44, 46 is parallel to the side 48 of the plate 34 and spaced a distance therefrom. These parallel legs are in a facing relation to each other so that the guides 44, 46 provide a guideway for longitudinal sliding movement of a slide 50, forming a portion of the friction wheel mount 32, as has been particularly shown in FIG. 4. As indicated therein and in FIG. 5, the slide 50 has the form of a rectangular plate and two edges of the slide 50 are disposed between the plate 34 of the base 28 and the legs of the guides 44, 46 parallel to the plate 34 so that the slide 50 can move along the center line 40 of the base 28. A threaded aperture (not shown) is formed through the plate 34 of the base 28, along the center line 40 and near the first end 36 of the base 28, to receive a bolt 52 for a purpose to be discussed below. To provide clearance between the bolt 52 and the slide 50 of the friction wheel mount 32, a longitudinally extending slot 54 is formed through the slide 50, the slot 54 extending along the center line 40 of the plate 34, about the bolt 52, so that the slide 50 can slide longitudinally on the plate 34.

Between the slot 54 and the guide 44, a second slot 56 (FIG. 5) is formed through the slide 50, the slot 56 intersecting the end of the slide 50 nearest the first end 36 of the base 28 and extending a distance into the slide 50 parallel to the slot 52. Welded to the side 48 of the plate 34, and extending therefrom through the slot 56 in the slide 50, is a first adjustment screw mount 58. A threaded aperture (not shown) is formed through the first adjustment screw mount 58, parallel to the center line 40 of plate 34, to receive a first adjustment screw 60 for a purpose to be described below.

Figure 5:
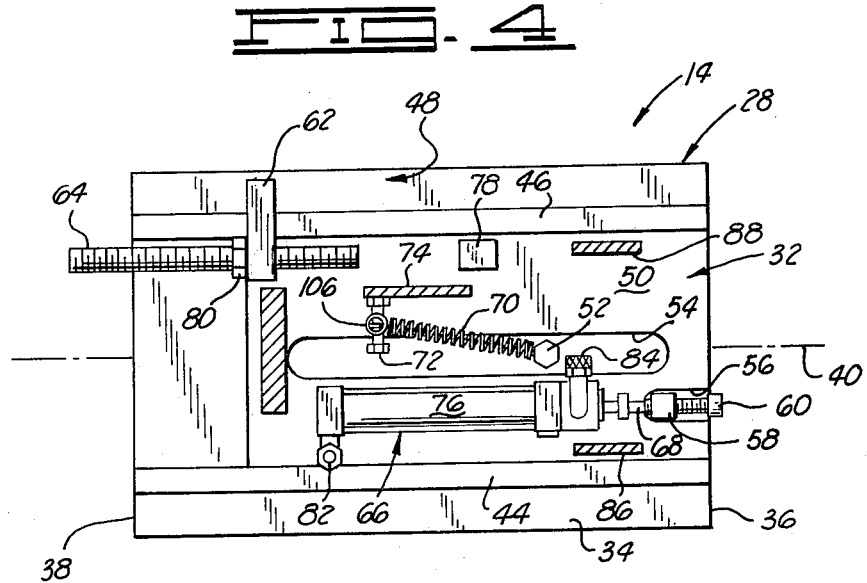
FIG. 5 is a cross-section of the friction wheel support assembly taken along line 5—5 of FIG. 2.

A second adjustment screw mount 62 is similarly welded to the side 48 of the plate 34 near the second end 38 of the base 28 and adjacent the guide 46, the second adjustment screw mount 62 being welded to portions of the plate 34 outside the guideway formed by the guides 44 and 46 and the second adjustment screw mount 62 having a portion which extends over the guide 46 to overhang the slide 50 of the friction wheel mount 32 as shown in FIG. 5. A threaded aperture (not shown) is formed through this overhanging portion of the second adjustment screw mount 62, parallel to the center line 40 of the plate 34, to receive a second adjustment screw 64.

The adjustment screws provide adjustable limits to the travel of the friction wheel mount 32 on the base 28 as will now be discussed with specific reference to FIG. 5. As shown therein, a pneumatic actuating cylinder 66 is mounted on the slide 50 of the friction wheel mount 32 in line with the first adjustment screw 60 and the cylinder 66 is disposed on the slide 50 such that the piston rod 68 thereof extends toward the first adjustment screw 60. In one preferred embodiment of the invention, for which FIG. 5 has been drawn, the friction wheel mount 32 is constantly urged toward the first end 36 of the base 28 by means of a spring 70 which is connected between the bolt 52 and a bolt 72 which is screwed into a bracket 74 on the slide 50 of the friction wheel mount 32. Accordingly, in this embodiment, the friction wheel mount 32 will be moved toward the first end 36 of the base 28 until the piston (not shown) of the pneumatic actuating cylinder 66 abuts the end of the barrel 78 of the pneumatic actuating cylinder 66 that is farthest from the first end 36 of the base 28 and the piston rod 68 engages the first adjustment screw 60. Thus, one limit on the travel of the friction wheel mount 32; that is, toward the first end 36 of the base 28, is provided by the engagement of the piston rod 68 with the first adjustment screw 60 and such limit is adjustable by turning screw 60 in the first adjustment screw mount 58. The limit on the travel of the friction wheel mount 32 toward the second end 38 of the base 28 is provided by a stop 78 which is attached to the plate 50 of the friction wheel mount 32 in line with the second adjustment screw 64 and such limit is similarly adjustable by turning the screw 64 in the mount 62. The positions of the limits, once determined as will be discussed below, can conveniently be fixed via locking nuts such as the nut 80 shown on the second adjustment screw 64.

In the operation of the present invention, to be discussed below, the friction wheel mount 32 is cyclically moved parallel to the center line 40 between the two limits of travel defined by the adjustment screws 60 and 64 and such movement is effectuated by the pneumatic actuating cylinder 66. For this purpose, the cylinder 66 has a first input port 82 which is disposed at the end of the barrel 76 farthest from the first adjustment screw 60 so that pneumatic pressure supplied to the first input port 82 will expand the pneumatic actuating cylinder 66 to drive the friction wheel mount 32 toward the second end of the base 28. The cylinder 66 also has a second input port 84 which opens into the end of the barrel 76 nearest the first adjustment screw 60 and, in the embodiment of the friction wheel support assembly 14 shown, the second input port 84 is left open to the atmosphere. However, the present invention contemplates that pneumatic pressure introduced into the second input port 84 can be used to move the friction wheel mount 32 toward the first end 36 of the base 28, in place of constant urging of the friction wheel mount 32 toward the first end 36 of the base 28 by the spring 70, and connections between the pneumatic cylinder 66 and the pneumatic control circuit, 16 or 16A, for both modes of operation will be discussed below. When pneumatic pressure is used to move the friction wheel mount 32 in both directions, the spring 70 is omitted and the piston rod 68 is attached to the first adjustment screw 60 via a conventional rotatable coupling.

Figure 3:
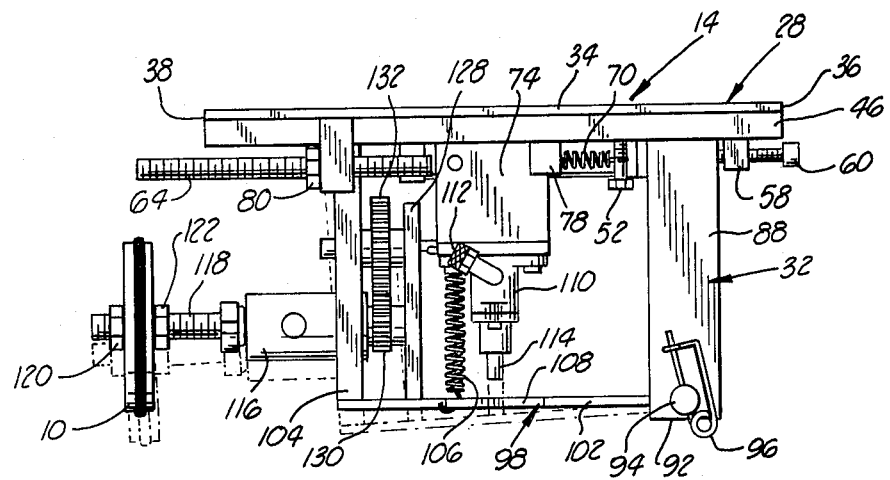
FIG. 3 is a bottom view of the friction wheel support assembly shown in FIG. 1.
Figure 4:
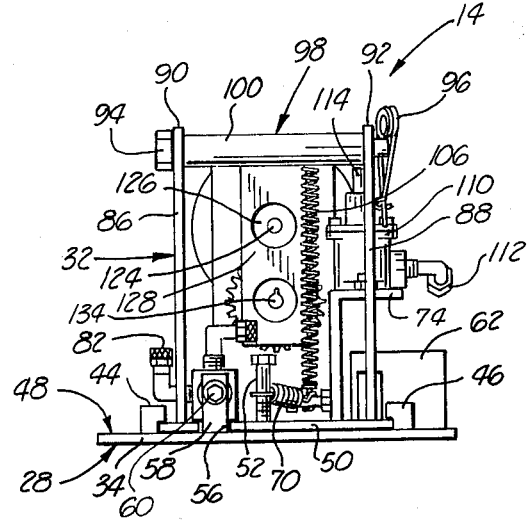
FIG. 4 is an end view of the friction wheel support assembly shown in FIG. 1.

With particular reference to FIGS. 2 through 4, the friction wheel mount 32 further comprises, in addition to the slide 50, two legs 86, 88 which are welded to the slide 50 near the end thereof nearest the first end 36 of the base 28. The legs 86, 88 are formed of flat stock and are positioned in a symmetric relation to either side of the slot 54 as has been indicated in FIG. 5. As shown in FIGS. 2 through 4, the legs 86, 88 extend, in a parallel relation, normally outwardly from the slide 50; that is, in a direction away from the side 48 of the plate 34 which is abutted by slide 50 so that the legs 86, 88 will extend substantially parallel to the axis 42 of the drum 12 and generally toward the center of the drum 12 when the friction wheel support assembly 14 is mounted on the supporting structure 30 as shown in FIG. 1.

Near the distal ends 90, 92 of the legs 86, 88 coaxial apertures (not shown), one in each leg 86, 88, are formed to accept a pin 94. One end of the pin 94 has an enlarged head to permit securing of the pin 94 to the legs 86, 88 via a clip 96 which passes through a hole (not shown) formed through the pin 94 near the other end thereof. The friction wheel mount 32 further comprises a friction wheel support bracket 98 which is pivotally connected to the legs 86, 88 via the pin 94, the bracket 98 comprising a tubular member 100 (FIG. 4) through which the pin 94 extends for this purpose. The bracket 98 further comprises an L-shaped member formed of a strap 102 (FIGS. 2 and 3) which is welded, at one end thereof, to the tubular member 100 and a strap 104 that is attached to the other end of the strap 104 and extends substantially normally therefrom to engage the slide 50 near the end thereof nearest the second end 38 of the base 28. A spring 106 is connected between the strap 102 and the bolt 72 (FIG. 5) to urge the distal end of the strap 104 against the slide 50 so that the bracket 98 will be biased toward the position shown in solid lines in FIGS. 1 and 3 but can be pivoted against the force of the spring 106 to the position shown in phantom lines in these Figures. Such movement is effected by a pneumatic support bracket positioning cylinder 110 which is mounted on the bracket 74 on the slide 50 so that the piston 114 of the pneumatic support bracket positioning cylinder 110 can be extended to engage a lip 108 on the strap 102, by introducing pressurized air into the input port 112 of the pneumatic support bracket positioning cylinder 110, as has been particularly indicated in FIG. 3. The purpose of pivoting the bracket 98 as shown in FIGS. 1 and 3 will be discussed below.

Referring particularly to FIG. 3, a bearing 116 is mounted on the strap 104 and such bearing rotatably supports a shaft 118 on which the friction wheel 10 is mounted and a circular hole (not shown) is formed through the center of the friction wheel 10 for mounting of the friction wheel 10 upon the shaft 118. Portions of the shaft 118 upon which the friction wheel 10 is mounted are threaded to accept nuts 120, 122 which are disposed on opposite sides of the friction wheel 10 to clamp the friction wheel 10 to the shaft 118. A portion 124 of the shaft 118 (see FIG. 4) extends through the bearing 116 and a hole (not shown) through the strap 104 and is supported by a bearing 126 which is disposed in a strap 128 which is welded, parallel to strap 104, to the strap 102 of the friction wheel support bracket 98. A gear 130 (FIGS. 2 and 3) is mounted on the shaft 118 between the plates 104 and 128 to turn with the friction wheel 10 and the gear 130 turns a second a gear 132 which is similarly mounted on a shaft 134 which is supported, for rotation of the gear 132 between straps 104 and 128, via suitable bearings in the straps 104 and 128. A flexible shaft, indicated at 136 in FIG. 1, is connected to the shaft 134 to transmit the rotation of the shaft 134 to the signal production assembly as will be described with reference to FIGS. 6 through 10.

Before describing the signal production assembly, it will be useful to briefly summarize the capabilities of the friction wheel support assembly 14. As described above, the friction wheel support bracket 98 is pivotally connected to the slide 50, via the legs 86, 88 and pin 94, and the slide 50, in turn, is slidably mounted on the base 28 for movement parallel to the center line 40 of the base 28. Since the center line 40 is disposed along a radius of the drum 12, such movement of the slide 50 permits the distance between the axis 42 of the drum 12 and the friction wheel 10 to be changed by shifting the slide 50 via the pneumatic cylinder 66. In particular, as will be made clear by reference to FIGS. 1 and 5, the slide 50 can be shifted, from a position near the first end 36 of the base 28, a selected distance toward the second end 38 of the base 28 by introducing air under pressure into the first input port 82 of the pneumatic cylinder 66. When pressure at the first input port 82 is relieved, the spring 70 returns the slide 50 to its initial position near the first end 36 of the base 28. (Alternatively, the spring 70 can be deleted and the return of the slide 50 can be accomplished by introducing air under pressure into the second input port 84.) Thus, by mounting the friction wheel 10 on the friction wheel support bracket 98 which, in turn, is mounted on the slide 50, the friction wheel can be selectively positioned at one of the two different distances from the axis 42 of the drum 12. This selectivity in the positioning of the friction wheel 10 permits the establishment of a nearly constant relationship between lengths of the cable 20 paid out to lower the drill string and angles through which the friction wheel 10 turns without regard to the lap of cable on the drum 12 from which the cable 20 is paid out. That is, for most of the length of a drill pipe segment, a penetration of a unit distance, for example, one foot, will correspond to a particular angle of rotation of the friction wheel 10 at such times that the friction wheel 10 engages a side, such as the side 22, of the drum 12. (The relationship between the penetration distance and angle of rotation of the friction wheel 10 also depends upon the number of loops of the cable 20 between the crown block and drilling swivel as will be discussed below.)

Similarly, the friction wheel 10 can be selectively moved into and out of engagement with the side of the drum 12 via the pneumatic support bracket positioning cylinder 110 and spring 106. As has been shown in FIG. 1, the friction wheel support assembly 14 is positioned such that, when the piston 114 of pneumatic support bracket positioning cylinder 110 is withdrawn, (see FIGS. 2 and 3), the spring 106 will hold the friction wheel mounting bracket 98 in a position wherein the friction wheel 10 is out of contact with the drum 12. The friction wheel 10 can then be forced against the side of the drum 12 by introducing air under pressure into the input port 112 of pneumatic support bracket positioning cylinder 110 so as to pivot the friction wheel mounting bracket to the position shown in dashed lines in FIG. 1. The purpose of this selective friction wheel engagement-disengagement capability will be discussed below.

DESCRIPTION OF FIGS. 6 THROUGH 10

Figure 6:
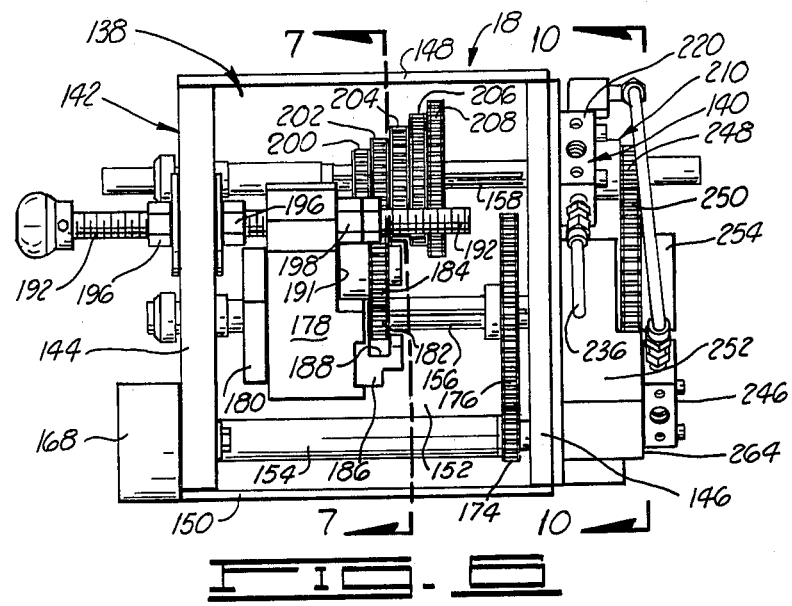
FIG. 6 is a plan view of one preferred embodiment of the signal production assembly of the penetration rate measuring apparatus with the cover of the transmission thereof removed.

The signal production assembly 18 generally comprises a variable ratio transmission 138 and a switch assembly 140 as has been particularly indicated in FIG. 6. The variable ratio transmission 138 comprises a metal case 142 which has the general form of a square box and includes first and second end plates, 144 and 146 respectively, which are held in a parallel, spaced relation by plates 148, 150 and 152 forming sides and a floor for the case 142. (The case 142 further comprises a cover plate which, for clarity of illustration, has not been shown in the drawings.)

Extending between the end plates 144, 146 are an input shaft 154, an intermediate shaft 156 and an output shaft 158 and conventional bearings are mounted in the end plates 144, 146 to support the shafts 154, 156 and 158 via the end plates 144, 146. The bearings which support the intermediate and output shafts in the first end plate 144 can be seen in FIG. 8 and are designated by the numerals 160 and 162 therein. Similarly, bearings which support the input and intermediate shafts in the second end plate 146 can be seen in FIG. 10 and are designated 164 and 166 therein. Similar bearings (not shown) are provided in the plate 144 to support the remaining end of input shaft 154 and in the plate 146 to support the remaining end of the output shaft 158.

Figure 8:
FIG. 8 is an elevational view of a first end of the signal production assembly shown in FIG. 6.

A portion of the input shaft 154 extends beyond the exterior face of the first end plate 144 and, as shown in FIGS. 6 and 8, a coupling 168 is fixed to such portion of the input shaft 154. The coupling 168 has a circular aperture 170 formed, coaxially with the input shaft 154, in the end thereof facing away from the case 142 and the transmission 138 is positioned near the drum 12 so that such aperture can receive a cylindrical member (not shown) which is fixed on the flexible shaft 136 of the friction wheel support assembly 14. A flat 172 is formed on one side of the coupling 168 and threaded holes (not shown), drilled into the flat 172, receive set screws (not shown) which fix the coupling 168 to both the cylindrical member on the flexible shaft 136 and the input shaft 154 of the transmission 138 so that rotation of the friction wheel 10 will result in a corresponding rotation of the input shaft 154.

Near the end of the input shaft 154 which is supported by the second end plate 146, a gear 174 is fixed on the input shaft 154 to mesh with a gear 176 which is similarly fixed on the intermediate shaft 156. (The shafts 154, 156 and 158 have circular cross-sections, as shown in FIG. 7, and longitudinal grooves are formed in the surfaces of the shafts 154, 156 and 158 to permit gears to be keyed to the shafts as has been indicated for gears designated 182 and 202 in FIG. 7.)

The transmission 138 further comprises a transmission block 178 and the circular cross-section of the intermediate shaft 156 provides a means for pivotally and slidably mounting the transmission block on the intermediate shaft 156. For this purpose, the transmission block 178 has a hole (not shown) bored through a medial portion thereof to permit passage of the intermediate shaft 156 therethrough and a bearing block 180 is bolted to the side of the transmission block nearest the first end plate 144 as shown in FIG. 6. The bearing block 180 has formed therethrough, coaxially with the hole through the transmission block 178, a hole (not shown) which is sized to slip on the intermediate shaft 156.

Figure 7:
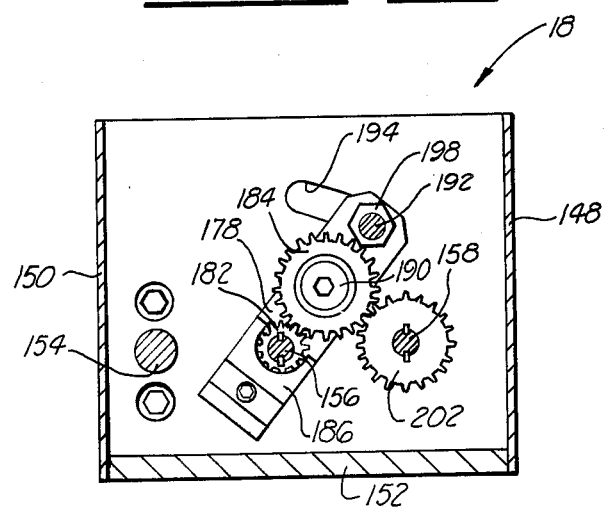
FIG. 7 is a cross-section of the signal production assembly shown in FIG. 6 and taken along line 7—7 of FIG. 6.

The transmission block 178 supports two meshed gears, 182 and 184, the gear 182 being keyed to the intermediate shaft 156, as indicated in FIG. 7, so that the gear 182 will slide on the shaft 156 but will not rotate thereon. As further shown in FIGS. 6 and 7, the gear 182 is held on the transmission block 178, such that the gear 182 can rotate relative to the transmission block 178, via a bracket 186 which is bolted to the side of the transmission block 178 nearest the second end plate 146 of the case 138, the bracket 186 having a groove 188 formed therein and extending arcuately about the intermediate shaft 156 to engage, without clamping, opposite sides of the gear 182. The gear 184 is rotatably mounted on the transmission block 178 via a shouldered bolt 190 which passes through the gear 184 and screws into a threaded hole (not shown) formed in a face 191, of the transmission block 178, that is normal to the axes of rotation of the gears 182, 184 and is recessed relative to the bracket 186 to provide clearance for the hub of the gear 184. (In order that the gear 184 will turn freely on the bolt 190, the gear 184 is selected to be of the type which has an integral needle bearing mounted about a central, axially extending aperture formed through the gear 184.)

As will be clear from the above description of the transmission block 178, the transmission block 178 can be both rotatably and axially positioned on the intermediate shaft 156 and such position is fixed via a threaded rod 192 which passes through a threaded hole (not shown) formed through the transmission block 178 parallel to the intermediate shaft 156 and near one end of the transmission block 178 as has been indicated in FIG. 7. The threaded rod 192 passes through an arcuate slot 194 formed in the first end plate 144 of the case 142 and nuts 196 are mounted on the rod 192, on opposite sides of the first end plate 144, to fix the position of the rod 192 relative to the case 142. Similarly, the position of the transmission block 178 is fixed on the rod 192 via a locking nut 198. The position of the transmission block 178 on the intermediate shaft 156 is changed by loosening the nuts 196 so that the rod 192 can be used to move the transmission block both axially and rotatably on the shaft 156. Once the position of the transmission block 178 has been selected, for a purpose to be discussed below, the nuts 196 are tightened to fix such position.

The transmission 138 further comprises a stepped series of gears 200, 202, 204, 206 and 208, which are mounted on the output shaft 158 for selective engagement with the gear 184 of the transmission block 178 so as to vary the ratio of the rotation of the output shaft 158 to the rotation of the input shaft 154. Such variation is made by pivoting and sliding the transmission block 178 on the intermediate shaft 156, as has been discussed above, such that the gear 184 of the transmission block 178 is meshed with a selected one of the gears 200–208. The purpose of providing the transmission 138 with a variable ratio of output shaft to input shaft rotation rate is to establish a constant relationship between angles of rotation of the output shaft 158 and penetration distances for the drill string even though the number of loops of the cable 20, between the crown block and drilling swivel, may be varied during the drilling of a well. As noted above, the relationship between an angle of rotation of the friction wheel 10, which is coupled to the input shaft 154 of the transmission 138, and a penetration distance for the drill string depends upon the number of loops of the cable 20 between the crown block and drilling swivel; in particular, if the friction wheel turns through an angle $\theta$ for a penetration of one foot when the cable 20 makes one loop between the crown block and drilling swivel, it will turn through an angle of $2\theta$ for one foot of penetration when the cable 20 makes two loops, $3\theta$ for three loops and so on. That is, the angles through which the friction wheel 10 will turn for a given distance of penetration, but varying numbers of loops of the cable 20, changes in direct proportion to the number of loops. The numbers of teeth on the gears 200 through 208 are similarly in direct proportion to whole numbers to provide a means of compensating for the increase in the angle of rotation of the friction wheel 10, for a predetermined penetration distance, when the number of loops between the crown block and drilling swivel is increased. Thus, the construction of the transmission 138 to include a stepped series of gears permits angles of rotation of the output shaft 158 to bear a fixed relation to penetration distances even though the relation between angles of rotation of the friction wheel 10 and penetration distances will vary with the number of loops of the cable 20 between the crown block and the drilling swivel. All that need be done when a loop is added between the crown block and drilling swivel during drilling operations is to engage the gear 184 with the next larger gear in the stepped series of gears 200–208. It will thus be seen that the relationship between penetration distances and angles of rotation of the output shaft 158 can be fixed by the positioning of the friction wheel mount 32 on the base 28 and by the choice of the gears 130 and 132 in the friction wheel support bracket 98 and, moreover, that such relationship can be maintained substantially constant despite changes in the lap from which the cable 20 is unwound (via shifting the friction wheel mount 32 on the base 28) and changes in the number of loops of the cable 20 between the crown block and drilling swivel (via the selection of the gear 200–208 engaged with the gear 184). In the preferred operation of the present invention, the output shaft 158 is caused to turn through one revolution for each foot of penetration of the drill string over the greatest portion of the distance the drill string is lowered in increasing the depth of the well by an amount equal to the length of a pipe segment.

As is shown in FIG. 6, the output shaft 158 extends outwardly of the second end plate 146 and the switch assembly 140 is mounted on the exterior surface of the second end plate 146 for actuation by rotation of the output shaft 158. The switch assembly, which is more particularly shown in FIGS. 9 and 10, comprises a cam 210 which, in one preferred embodiment of the present invention, has a cylindrical body portion 212 and a spherical projection 214 attached to the cylindrical surface 216 of the body portion 212. A hole 218, sized to fit the output shaft 158, is formed through the body portion 212 of the cam 210, concentrically with the surface 216, for mounting the cam 210 on the output shaft 158 via a set screw (not shown) or the like.

The switch assembly 140 further comprises two normally closed pneumatic switches 220, 222 which will be referred to herein as a "set" switch and a "reset" switch respectively for reasons which will become apparent below. The switches 220, 222 each have an operating lever 224 and the switches 220, 222 are positioned on the second end plate 146 such that portions of the operating levers 224 will engage the cylindrical surface 216 of the body portion 212 of the cam 210, without opening the switches 220, 222. (For a purpose to be discussed below, a particularly suitable arrangement of the switches 220, 222 is on substantially opposite sides of the cam 210 so that the operating levers 224 engage diametrically opposed portions of the cam 210 as has been shown in FIGS. 9 and 10.) As will be clear from FIGS. 9 and 10, the projection 214 will sequentially engage the operating levers 224 of the switches 220, 222 as the cam 210 is rotated via rotation of the output shaft 158 when the friction wheel 10 engages the side 22 of the drum 12 and the projection 214 is made of a size to open each of the switches 220, 222 as the operating levers 224 thereof are so engaged.

Each of the switches 220, 222 has an input port 226 and the input ports 226 are both connected to a pneumatic pressure line 228 which, in turn, is connected to an air manifold 230 mounted on the second end plate 146 of the case 142 of the transmission 138. The manifold 230 has a plurality of air passages, indicated in dashed lines in FIG. 10, and portions of these passages are adapted to receive pneumatic connectors so that pressurized air can be transmitted to and from the switches 220, 222 via connections made to the manifold 230 as will be discussed below. In particular, the pressure line 228 is connected to a passage 232 in the manifold 230 so that pressurized air can be transmitted to the switches 220, 222 by connecting the passage 232 to a suitable source of compressed air. Similarly, the output port 234 of the set switch 220 is connected, via a tube 236, to a passage 238 in the manifold 230 so that a pulse, sometimes referred to herein as a "set" pulse, of pressurized air can be received from the set switch 220 each time the set switch 220 is opened by engagement of the operating lever 224 thereof by the projection 214 as discussed above. The output port 240 of the reset switch 222 is similarly connected to a passage 242 in the manifold 230 by a tube 244 so as to provide a "reset" pulse each time the reset switch 222 is opened by the projection 214.

Figure 9:
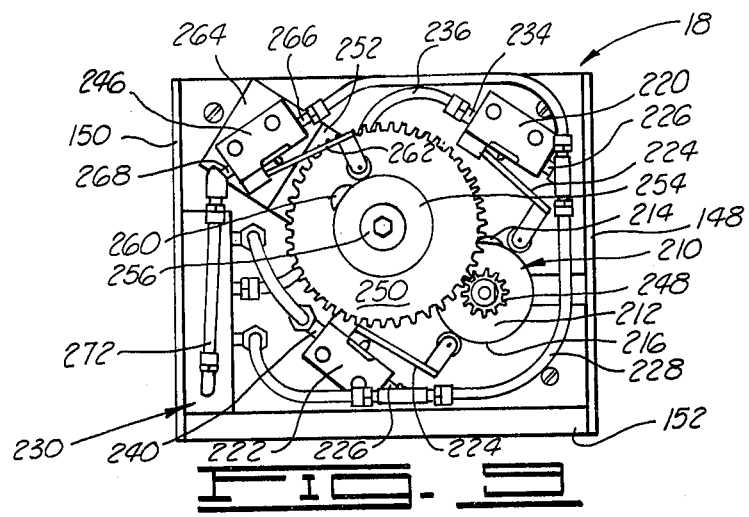
FIG. 9 is an elevational view of a second end, opposed to the first end, of the signal production assembly shown in FIG. 6.
Figure 10:
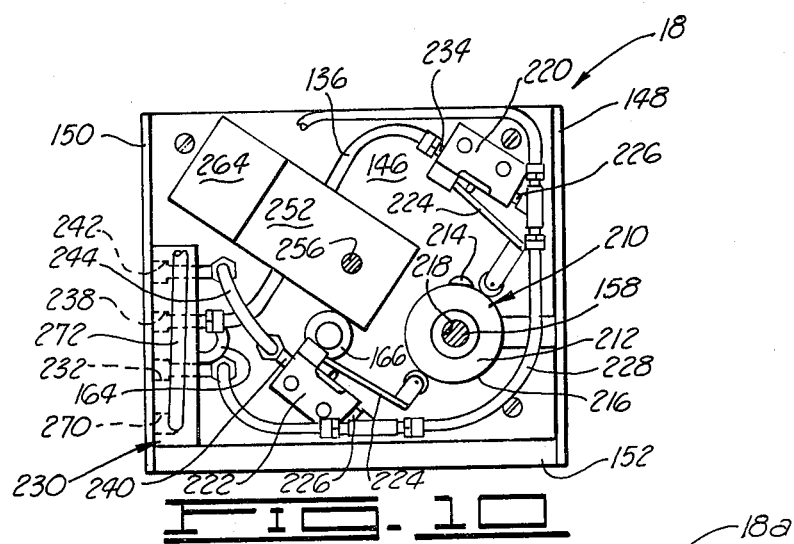
FIG. 10 is a cross-section of the signal production assembly taken along line 10—10 of FIG. 6.

As will be discussed below, for purposes of making a strip chart upon which the penetration of a drill string is recorded, it is desirable that the signal generation assembly 140 include a third, normally closed switch, shown in FIG. 9 and designated by the numeral 246 therein, which provides one pulse for each five set and reset pulses, such pulse being synchronized with each fifth "set" pulse. (The switch 246 will be referred to herein as a "gate" switch for a reason which be become apparent below.) this five-to-one reduction in the number of pulses provided by the set switch 220 and the gate switch 246 is accomplished via a gear 248, mounted on the output shaft 158, and a gear 250, mounted on the second end plate 146, as has been shown in FIGS. 6 and 9. In particular, the gear 248 is mounted on the output shaft 158 to abut the outer end of the cam 210 and the gear 250, which has five times the number of teeth as the gear 248, is mounted on a support block 252 which spaces the gear 250 from the second end plate 146 a distance sufficient to cause the teeth of the gear 250 to mesh with the teeth of the gear 248 as shown in FIG. 6. Like the gear 184, the gear 250 is of the type that has an integral needle bearing about a central, axially extending aperture of the gear 250 so that the gear 250 can be mounted on the support block 252 via a shouldered bolt 256. A projection 260 is mounted on an integral hub 254 of the gear 250 so that the hub 254 and projection 260 form an auxiliary cam for operating the gate switch 246. The gear 248, which meshes with the gear 250, is fixed to the output shaft 158 by a means of a set screw (not shown) so that every fifth pulse produced by the set switch 220 can easily be synchronized with pulses produced by the gate switch 246. That is, with the output shaft 158 positioned to cause the projection 214 to open the set switch 220 and with the gear 248 loosely mounted on the output shaft 158, the gear 250 can be turned so that the projection 260 opens the gate switch 246. The gear 248 is then fixed to the output shaft 158.

In order that the operating lever 262 be positioned to engage the projection 260, the gate switch 246 is mounted on a ledge 264 formed on the end of the support block 252 disposed away from the output shaft 158 of the transmission 138. The gate switch 246 is then caused to produce a pulse, each time the operating lever 262 thereof is engaged by the projection 260, by extending the pneumatic pressure line 228 to the input port 266 of the gate switch 246 and by connecting the output port 268 of the gate switch 246 to a passage 270 in the manifold 230 via a tube 272 as has been shown in FIG. 9.

The pneumatic pulses produced by the switches 220, 222 and 246 are utilized for purposes of marking a strip chart on a recorder as will be discussed shortly with reference to FIGS. 12 and 13. In addition, the set pules, which will also, at times, be referred to herein as depth indicator signals, are utilized to maintain a substantially constant relationship between penetration distances for the drill string and angles of rotation of the output shaft 158 of the transmission 138 as will also be discussed below. In order to facilitate these subsequent discussions, it will be useful to summarize the operational capabilities of the signal production assembly 18 at this point.

The connection of the input shaft 154 of the transmission 138 with the shaft 134 of the friction wheel support assembly 14, via the flexible shaft 136, and the connection of the shaft 134 with the friction wheel 10, via the gears 130 and 132, causes the input shaft 154 to rotate in response to rotation of the friction wheel 10 occasioned by engaging the friction wheel 10 with the side of the drum 12 as has been described above. The output shaft 158 of the transmission 138 is then caused to rotate by the gear train comprised of the gears 174, 176, 182, 184 and a selected one of the gears 200–208 shown in FIG. 6. This last rotation; that is, the rotation of the output shaft 158, is transmitted to the cams 210 and 254 to cause the generation of pulses by the switches 220, 222 and 246 as has been described above. Specifically, each time the output shaft 158 rotates one time, the set switch 220 will generate a set pulse and the reset switch 222 will then generate a reset pulse. Accompanying every fifth set pulse, the gate switch 246 will concurrently generate one pulse of pressurized air.

As will be clear from the relative sizes of the gears shown in the drawings, the output shaft is caused to rotate at a reduced rate relative to the rotation rate of the friction wheel 10. This reduction permits compactness in the construction of the present invention by permitting the use of a relatively small friction wheel and a correspondingly compact friction wheel support assembly 14 as will now be discussed. It is desirable in the use of the present invention that the output shaft rotate once for the penetration of the drill string by one unit of distance which, for most practical purposes, will be one foot. This penetration distance will in turn correspond, as will be clear to those skilled in the art, to a payout of two feet of cable from the drum 12 for each loop the cable 20 makes between the crown block and the drilling swivel. Moreover, the friction wheel 10 will be located a distance from the axis of the drum 12 which is comparable to, though not necessarily the same as, the radius of the outermost lap of cable 20 on the drum 12 so that the net angle, in radian measure, through which the friction wheel will rotate, for each loop of cable between the crown block and drilling swivel, is of the same order of two feet divided by the radius, in feet, of the friction wheel 10. The gear reduction to be provided by the gears 130, 132 in the friction support assembly 14 and by the gear train in the transmission 138, such gear train terminating in the smallest of the stepped series of gears 200 through 208 for the minimum number of loops between the crown block and drilling swivel that will be used in drilling a particular well, is this number divided by two $\pi$; that is, approximately six. Thus, for example, if it is contemplated that the smallest number of loops to be used in drilling a well is three and it is desirable to use a four inch diameter friction wheel, the gear train to the gear 200 will be selected to provide a reduction of approximately six; that is, six feet divided by one-sixth foot and further divided by six (approximately two $\pi$). With a gear reduction of this order, the adjustment screws 60 and 64 will permit positioning of the slide 50 of friction wheel mount 32 so as to cause one revolution of the output shaft 158 for each one foot of penetration in a manner to be discussed below.

Figure 11:
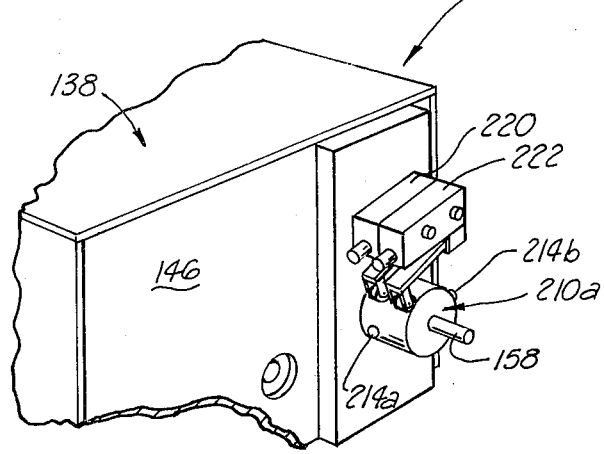
FIG. 11 is an isometric view of a portion of a signal production assembly similar to the signal production assembly of FIGS. 6 through 10 but having a modified switch assembly.

FIG. 11 has been included to show a second embodiment, designated 18a, of a signal production assembly suitable for inclusion in the present invention. The signal production assembly 18a includes a variable transmission which is substantially identical to the transmission 138 of the signal production assembly 18 and which, accordingly, has been designated by the reference numeral 138 in FIG. 11. The signal production assembly 18a differs from the signal production assembly 18, however, in that the set and reset switches 220, 222 are mounted on the second end plate 146 of the transmission 138 in a different manner. Specifically, as shown in FIG. 11, the switches are mounted side-by-side rather than in substantial diametric opposition as is the case for the signal production assembly 18. In order that each of the switches then produce set and reset signals as the output shaft 158 rotates, the cam 210 of the signal production assembly 18 is replaced with a cam 210a which is provided with two spherical projections, 214a (for the set switch 220) and 214b (for the reset switch 222). It will be noted that the projections 214a and 214b are angularly offset so that the set and reset pulses will be temporally spaced. (A similar temporal spacing of the set and reset pulses is achieved in the signal production assembly 18 by means of the placement therein of the switches 220, 222 and the use of one projection 214 to sequentially open the switches each time the cam 210 rotates.) The purpose of this temporal spacing of the set and reset signals will be discussed below. Remaining portions (not shown) of the switch assembly of the signal production assembly 18a are substantially identical to remaining portions of the switch assembly 140 of the signal production assembly 18.

DESCRIPTION OF FIG. 12

Figure 12:
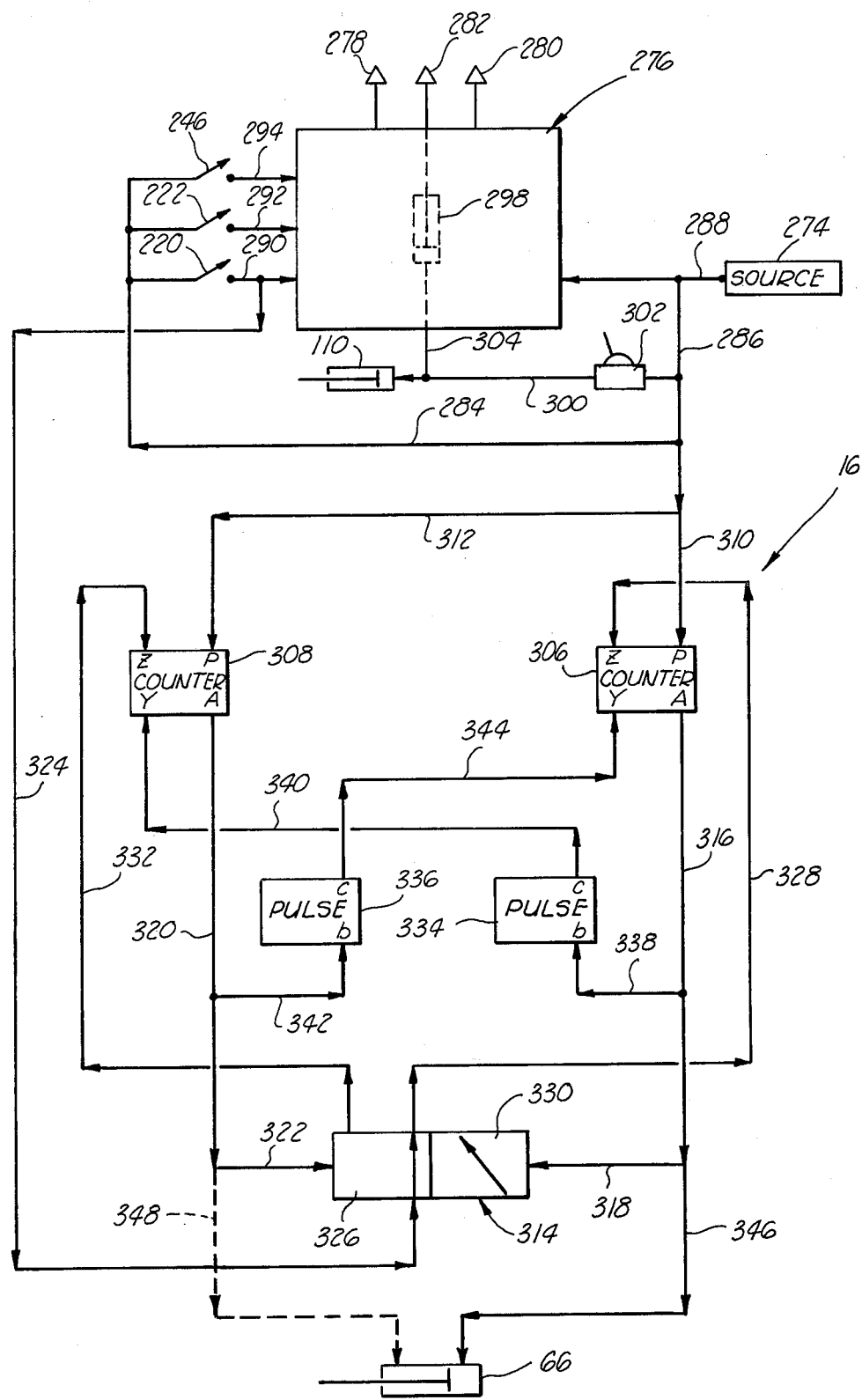
FIG. 12 is a schematic circuit diagram of one preferred embodiment of the pneumatic control circuit forming another portion of the shift assembly of the penetration rate measuring apparatus of the present invention.

Referring now to FIG. 12, shown therein and designated by the general reference numeral 16 is one preferred embodiment of the pneumatic control circuit which, as noted, above, combines with the friction wheel support assembly 14 to form one of the three operational groups of the present invention; that is, the shift assembly which is utilized to reposition the friction wheel 10 as a transition occurs in the lap of the cable 20 on the drum 12 from which the cable 20 is paid off the drum 12 in lowering a drill string in a well drilling operation. Prior to describing the pneumatic control circuit 16, it will be useful, for purposes of providing a better understanding of the present invention, to briefly describe components used therewith, and also schematically illustrated in FIG. 12, to carry out the basic object that the present invention has of facilitating the recordation of drill string penetration in the drilling of an oil or gas well.

It is contemplated that the present invention will be used with some mechanism, designated 276 in FIG. 12 and operable from a suitable source 274 of compressed air, to mark a chart on a recorder (not shown) in response to pneumatic pulses from the signal production assembly 18 or 18a so that such chart will provide a record of the penetration of a drill string in well drilling operations. A particularly suitable mechanism for this purpose is the control circuit described in my U.S. Pat. No. 4,099,410, such circuit being designated by the numeral 24 therein, and FIG. 12 has been drawn to illustrate the use of the present invention with such a circuit. As described in my patent, such control circuit includes a pneumatic ram (indicated at 298 in FIG. 12) having a frusto-conical portion (indicated at 282 in FIG. 12) which is moved in response to compressed air supplied to the ram to displace the pen of a strip chart recorder a relatively short distance from the undisturbed position of the pen. This ram is utilized to indicate that drilling is proceeding and is supplied with compressed air from the source 274 at all times that drilling is underway as will be discussed below.

In addition, the control circuit of my patent includes a ram which has a frusto-conical portion (indicated at 278 in FIG. 12) which momentarily moves the pen of the recorder an intermediate distance each time the circuit receives a pneumatic set pulse on a conduit which has been shown in FIG. 12 and designated by the numeral 290 therein where successive set pulses are interspersed with pneumatic reset pulses received in a conduit which has similarly been shown in FIG. 12 and is designated by the numeral 292 therein. (The temporal spacing of the set and reset pulses described above is to cause such interspersing of a series of set pulses with reset pulses.) The conduits 290 and 292 correspond to the signal paths 98 and 102, respectively, shown in my patent, and, in such patent, are connected to switches which have been denominated as a set switch 70 and a reset switch 78. These switches correspond to the similarly denominated set switch 220 and reset switch 222 of the present invention and the set switch 220 and reset switch 222 are connected to the mechanism 276 by connecting the conduits 290 and 292 to the passages 238 and 242, respectively, in the manifold 230 shown in FIG. 10.

As further described in my patent, the control circuit shown therein further includes a third ram having a frusto-conical portion (indicated at 280 in FIG. 12) which moves the pen of the recorder a relatively long distance each time such circuit receives, concurrently with a set pulse, a pneumatic gate pulse on a conduit which has been shown in FIG. 12 and designated by the numeral 294 therein. The conduit 294 corresponds to the signal path 120 shown in my patent and, in such patent, is connected to a switch which has been denominated as a gate switch 104 therein. This switch corresponds to the similarly denominated gate switch 246 of the present invention and the gate switch 246 is connected to mechanism 276 by connecting the conduit 294 to the passage 270 in the manifold 230 shown in FIG. 10.

In so far as recording penetration depth is concerned, the set switch 220, reset switch 222, gate switch 246 and frusto-conical portions 278-282 have the same functions as corresponding components described in my above referenced U.S. Pat. No. 4,099,410. Pneumatic pressure is supplied to the switches via conduits 284, 286 and 288 leading to the source 274 shown in FIG. 12. (The conduit 288 is extended to the mechanism 276 to provide pneumatic pressure to components of such mechanism as indicated in FIG. 6 of my above referenced patent.) In response, as the friction wheel 10 is rotated by the drum 12 to momentarily open the set switch 220 and reset switch 222 in sequence as described above, the set switch 220 and reset switch 222 cause the frusto-conical portion 278 to move the pen of a recorder to make a relatively short mark on the chart thereof so that a mark is made each time the cam 210, or the cam 210a, makes one revolution. Similarly, the frusto-conical portion 280 will cause every fifth mark made by the pen to be relatively long because of the opening of the set switch 246 by the cam 254 concurrently with every fifth opening of the set switch 220 as described above. Moreover, the ram 298 receives pneumatic pressure via the conduit 286, conduits 300 and 304, and a manually actuated switch 302 so that the base line which indicates that drilling is proceeding is made by opening the switch 302. The switch 302 is closed at such times that drilling is not proceeding; for example, while a new segment of pipe is being added to the drill string, and such closure causes the frusto-conical portion 282 of the ram 298 to disengage the pen of the recorder so that the pen moves away from the base line to indicate down time in the drilling operation. (The switch 302 is of the type that exhausts downstream conduits connected thereto at such times that the switch 302 is closed.) In order that the mechanism 272 will not produce marks on the chart of the recorder during such down time, the conduit 300 is conveniently extended to the input port 112 (not shown in FIG. 12) of the pneumatic support bracket positioning cylinder 110 (see also FIG. 3) so that the spring 106 will pivot the bracket 98 of the friction wheel mount 32 to disengage the friction wheel 10 from the drum 12 at such times that the switch 302 is closed.

While the characteristics of the mechanism 276 and the connection of various components of the present invention thereto have been discussed in order to provide a complete understanding of the present invention, it will be understood that the present invention is not limited to use with a recording mechanism such as that briefly described above and described in more detail in my U.S. Pat. No. 4,099,410. Rather, the present invention can be used in conjunction with any recording mechanism which receives pneumatic depth indicator signals, such as those produced by the set switch 200, and is responsive to such signals to suitably mark a chart on a recorder. That is, the present invention specifically concerns the production of pneumatic depth indicator signals in response to equal increments of penetration of a drill string rather than the manner in which such signals are utilized to provide a record of penetration depth.

Referring now to the pneumatic control circuit 16 shown in FIG. 12, such circuit comprises a first pneumatic counter 306 and a second pneumatic counter 308 which are each connected to the source 274 to transmit pneumatic pressure therefrom in response to the reception of a series of pneumatic count pulses which are alternatively supplied to the counters 306, 308 as will be discussed below. Suitable counters for use in the pneumatic control circuit 16 are model 59802 pneumatic predetermining counters manufactured by the Aro Corporation, One Aro Center, Bryan, Ohio 43506 and the counters 306, 308 have been drawn in FIG. 12 to conform to drawings in the manufacturer's literature. Specifically, the counters 306, 308 each have: a supply port, indicated by the letter P in the drawings; an output port, indicated by the letter A in the drawings; a count port, indicated by the letter Z in the drawings; and a reset port, indicated by the letter Y in the drawings. As is shown in FIG. 12, the supply ports P of both counters are connected to the source 274 of pneumatic pressure via the conduit 286 and conduits 310 (to the counter 306) and 312 (to the counter 308).

Each of the counters 306, 308 is of the type which can be reset, via a pulse supplied to the reset port Y thereof, so as to be enabled to subsequently count a selected number of pulses subsequently supplied to the count port Z thereof. (The number of pulses that the counters 306, 308 are to count is manually set into the counters.)

The counters 306, 308 are further of the type which have normally exhausted output ports; that is, for each counter, the output port A thereof is internally exhausted while that counter is counting pulses, and the supply port P of each counter will be internally connected to the output port A thereof at such time, following reset of the counter, that the count reaches the number which has been manually set into the counter. The connection of the output port A of either counter to the supply port P thereof is then maintained until such counter is again reset either by a reset pulse supplied to the reset port Y thereof, or by manually resetting the counter by depressing a reset button provided on the counter for that purpose.

In the present invention, the output ports A of the counters 306, 308 are connected to opposite sides of a pneumatically operated spool valve 314 via conduits 316 and 318 (from the counter 306) and conduits 320 and 322 (from the counter 308) so that the valve member thereof can be shifted in one direction by counter 306 and in the opposite direction by counter 308. The spool valve 314 is further connected to the conduit 290, via a conduit 324, to receive the depth indicator signals produced by the set switch 220, and is utilized to transmit these signals, as count pulses, to the count port Z of one or the other of the counters 306, 308. Specifically, the spool valve 314 has a first section, schematically indicated at 326, which provides fluid communication between the conduit 324 and a conduit 328, which is connected to the count port Z of the counter 306, at such times that the spool valve 314 receives pressurized air from the counter 308 via the conduits 320 and 322. Similarly, the spool valve has a second section, schematically indicated at 330, which provides fluid communication between the conduit 324 and a conduit 332, which is connected to the count port Z of the counter 308, at such times that the spool valve 314 receives pressurized air from the counter 306 via the conduits 316 and 318.

The pneumatic control circuit 16 further comprises first and second pulses generators, 334 and 336 respectively, which can conveniently be model 59114 "DIF" logic elements supplied by the aforementioned Aro Corporation of Bryan, Ohio. These pulse generators each have one input port (indicated by the symbol b in conformity with the manufacturer's literature) and one output port (similarly indicated by the symbol c) and are constructed to provide one pneumatic pulse at the output ports c thereof when pneumatic pressure is applied at the input ports b thereof following a period in which the input ports b thereof have been exhausted. The input port b of the first pulse generator 334 is connected to the output port A of the first counter 306 via a conduit 338 and the conduit 316 and the output port c thereof is connected to the reset port Y of the second counter 308 via a conduit 340. Similarly, the input port b of the second pulse generator 336 is connected to the output port A of the second counter 308 via a conduit 342 and the conduit 320 and the output port c thereof is connected to the reset port Y of the first counter 306 via a conduit 344.

During operation of the present invention, to be discussed below, pressurized air transmitted from the source 274 by the first counter 306 is used to shift the friction wheel mount 32 away from the first end 36 of the base 28 as has been described above in the discussion of the friction wheel support assembly 14. For this purpose, a conduit 346 is connected from the conduit 316, shown in FIG. 12, to the first input port 82 of the cylinder 66 shown in FIG. 5. As discussed above, the spring 70 can be used to return the friction wheel mount 32 to a position adjacent the first end 36 of the base 28 when the first input port 82 of cylinder 66 is exhausted but, as an alternative, such return can be effected by pneumatic pressure transmitted to the second input port 84 of cylinder 66. To effect this alternative, a conduit 348, indicated in dashed lines in FIG. 12, can be connected from the conduit 320 to the second input port 84 of cylinder 66 so that pressurized air can be transmitted to the cylinder 66, to effect the return, by pressurized air transmitted by the second counter 308.

The operation of the pneumatic control circuit 16 is cyclic with the result that a series of pressure signals is supplied to the cylinder 66 to cause the cylinder 66 to repetitively shift the friction wheel mount 32 away from the first end 36 of the base 28 and then return the friction wheel mount 32 to a position adjacent such first end 36 as will be discussed below. To provide a basis for such later discussion, it will be useful to first discuss the cyclic operation of a pneumatic control circuit 16 and, to do so, it will be considered that the pneumatic control circuit 16 is receiving a sequence of depth indicator signals from the set switch 220, the last signal so received being transmitted via the spool valve 314 to the second counter 308 to operate the second counter 308 to internally connect the outport A thereof to the supply port P thereof. In response to the resulting transmission of pressurized air by the second counter 308, such air being transmitted to the input port b of the second pulse generator 336 via conduits 320 and 342, the second pulse generator 336 will be operated to transmit a pulse to the reset port Y of the first counter 306 on conduit 344. Such pulse resets the first counter 306 to count a selected number of count pulses transmitted to the count port Z thereof. Concurrently with the transmission of pressurized air to the second pulse generator 336, pressurized air is transmitted, on conduits 320 and 322, to the spool valve 314 to shift the spool thereof such that subsequent depth indicator signals will be transmitted, through the first section 326 of the spool valve 314, to the count port Z of the first counter 306.

As the generation of depth indicator signals by the set switch 220 and the transmission of such signals to the first counter 306 proceeds, the first counter 306 will count such signals until the number of such signals reaches the preselected number entered into the first counter 306. At this point, the first counter 306 will operate to internally connect the output port A thereof to the supply port P thereof. In response to the resulting transmission of pressurized air by the first counter 306, such air being transmitted to the input port b of the first pulse generator 334 via conduits 316 and 338, the first pulse generator 334 will be operated to transmit a pulse to the reset port Y of the second counter 308 on conduit 340. Such pulse resets the second counter 308 to count a selected number of depth indicator signals transmitted to the count port Z thereof. Concurrently with the transmission of pressurized air to the first pulse generator 334, pressurized air is transmitted, on conduits 316 and 318, to the spool valve 314 to shift the spool thereof such that subsequent depth indicator signals will be transmitted, through the second section 330 of the spool valve 314, to the count port Z of the second counter 308.

As the generation of depth indicator signals by the set switch 220 and the transmission of such signals to the second counter 308 proceeds, the second counter will count such signals until the number of such signals reaches the preselected number entered into the second counter 308. At this point, the second counter 308 will operate to internally connect the output port A thereof to the supply port P thereof to complete the cycle. Thus, in each cycle, the first counter 306 will count a selected first number of depth indicator signals while the output port A thereof is exhausted and the output port A of the second counter 308 is internally connected to the supply port P thereof to operate the spool valve 314 to channel the depth indicator signals to the first counter 306. At the completion of the counting of such first number of signals, the first counter 306 becomes operative to transmit pressurized air to the spool valve 314 so as to channel subsequent depth indicator signals to the second counter 308 which counts a selected second number of depth indicator signals to complete the cycle. It will thus be seen that pressurized air is transmitted, via the conduits 316 and 346, to the first input port 82 of the cylinder 66 only for the latter part of the cycle; that is, after the selected first number of depth indicator signals have been counted by the first counter 306. Such transmission of pressurized air to the cylinder 66 will then continue while the second counter 308 counts the selected second number of depth indicator signals to complete the cycle. The cycle will then be repeated for subsequent reception of depth indicator signals by the pneumatic control circuit 16 so that the friction wheel mount 32 is repetitively shifted on the base 28 in response to a series of depth indicator signals.

OPERATION OF FIGS. 1 THROUGH 12

In the use of the present invention, the cycling of the pneumatic control circuit is caused to coincide with the cycling of drilling operations in which, during each such cycle of drilling, a new segment of drill pipe is added to the drill string and then lowered during additional drilling of the well. Specifically, such coincidence is used to cause the friction wheel to shift inwardly as the outermost lap of cable 20 on the drum 12 becomes completely paid out so that the distance the drill string is lowered between consecutive generation of depth indicator signals will remain substantially constant without regard to the lap of cable on the drum 12 from which such cable is paid out as will now be described. (As will be clear to those skilled in the art, the transition between laps does not occur at a sharply defined position of the drum 12 such that the radius of the cables on the drum has one well-defined value up to a certain position of the drum and a different, well-defined value beyond such position. Rather, the radius of the cable on the drum undergoes a transition from one well-defined value to another well-defined value over a short range in the position of the drum so that consecutive depth indicator signals, one of which is produced during the transition, will not correspond exactly to one unit of penetration distance. However, consecutive depth indicator signals made to either side of the transition range will correspond to equal penetration distances for the drill string and the transition distance is, for drum and cable sizes, commonly used in drilling a well, of the order of a foot while drill pipe segments are of the order of thirty feet in length so that, where the selected unit of penetration is one foot, most of the pairs of consecutive depth indicator signals will correspond to equal distances of penetration. Thus, since the depth indicator signals are used, by the mechanism 276, to make a record of penetration depth and since it is the overall pattern of the record that is of interest, as noted above, the effect of the transition being laps occurring over a range of positions of the drum, rather than at a sharply defined position, is of minimal practical significance.)

At the time that the present invention is mounted on a drilling rig, the number of loops of the cable 20 between the crown block and the drilling swivel will have been determined by requirements which are associated with the drilling of the well and will be known to the user of the present invention. This number is set into the variable transmission 138 by the selection of the gear 200-208 that is engaged by the gear 184 as has been discussed above. Moreover, from the diameter of the outermost lap of cable 20 on the drum 12, the gear reduction from the friction wheel 10 to the output shaft 158 of the variable ratio transmission 138 and the diameter of the friction wheel 10, the approximate distance between the friction wheel 10 and the axis 42 of the drum 12 such that the output shaft 158 of the transmission 138 will rotate once for each unit distance of penetration of the drill string can be calculated. (As has been noted above, the diameter of the friction wheel 10 and the gear reduction between the friction wheel 10 and the output shaft 158 will have been previously selected such that this distance will be of the order of the radius of the outermost lap of cable 20 on the drum 12.) With this information, the base 28 of the friction wheel support assembly 14 is mounted on the supporting structure 30 so that, when the friction wheel mount 32 is adjacent the first end 36 of the base 28 of the friction wheel support assembly 14, the friction wheel 10 will be disposed such distance from the axis 42 of the drum. The flexible shaft 136 is then connected between the friction wheel support assembly 14 and the variable ratio transmission 138, as has been discussed above, so that the rotation of the friction wheel 10 by engagement thereof with the side 22 of the drum 12 will cause a corresponding rotation of the output shaft 158 of the variable transmission 138. (In order that the connection between the friction wheel assembly 14 and the variable ratio transmission 138 can be conveniently made, the variable ratio transmission 138 can be placed at a position near the drum 12. Remaining portions of the present invention, which are connected to the friction wheel support assembly 14 and the signal production assembly 18 only via pneumatic conduits, can conveniently be located in the control house of the drilling rig.) The source of pneumatic pressure 274 is then connected to the switch 302 used to operate the pneumatic support bracket positioning cylinder 110 and to the switches 220, 222 and 246 of the switch assembly 140.

With the components of the present invention so connected, the positions of the friction wheel 10 to result in the rotation of the output shaft 158 of the transmission 138 through exactly one turn for one unit of penetration of the drill string for paying out of cable from both the outermost lap of the drum 12 and the lap adjacent thereto, is fixed via the adjustment screws 60 and 64 as will now be explained. Initially, the drilling swivel is raised such that cable is wound on the drum 12 in the outermost lap that will be used during the lowering of the drill string and the switch 302 (FIG. 12) is opened to transmit pressurized air to the cylinder 110 of the friction wheel support assembly so that the cylinder 110 pivots the friction wheel support bracket 98 so as to engage the friction wheel 10 with the side of the drum 12. The drilling swivel is then lowered to a position such that the set switch 220 is just opened. The drilling swivel is further lowered until the set switch 220 is again just opened and the distance the swivel is lowered between the two consecutive openings of the set switch 220 is measured. The first adjustment screw is then used to reduce any discrepancy between the actual distance the swivel is lowered and the desired unit penetration distance by repositioning the friction wheel mount 32, and accordingly the friction wheel 10, along a line extending radially of the axis 42 of the drum 12. For example, if the drilling swivel is lowered by a distance greater than the desired unit penetration distance, the first adjustment screw 62 is turned in a direction to decrease the distance between the axis 42 of the drum 12 and the friction wheel 10. This adjustment process is then repeated until, for paying out of cable from the outermost lap and for positioning of the friction wheel mount 32 adjacent the first end 36 of the base 28 of the friction wheel support assembly 14, successive depth indicator signals will be generated by the set switch 220 for one unit distance of penetration of the drill string. The second adjustment screw 64 is similarly used for precisely establishing the position of the friction wheel 10 for paying out of cable from the lap adjacent the outermost lap of cable on the drum. During this latter adjustment, pressurized air is transmitted to the cylinder 66 of the friction wheel support assembly 32 to force the stop 78 on the slide 50 into engagement with the second adjustment screw 64. Following such adjustment, all connections between elements of the present invention can be made as has been recited in the description of the construction of the invention above.

Following the positioning of the friction wheel, the drilling swivel is raised to the level from which drilling would begin after the addition to the drill string of a drill pipe segment having the nominal length of such segment and then lowered until the outermost lap of cable on drum 12 is paid off of the drum 12. During such lowering, the number of depth indicator signals generated by the set switch 220 is counted and the number of signals necessary for the drum to reach approximately the center of the range of positions thereof during which the cable passes from being wrapped in the outermost lap on the drum to being wrapped in the lap adjacent thereto is selected as the first number of counts to be placed in the first counter 306. (The friction wheel 10 can be adjusted by hand to cause the last depth indicator signal generated by the set switch 220 in such number of such signals to occur at approximately the midpoint of the range of drum positions for which the transition from one lap to another occurs. However, since the significance of such adjustment would be to minimize the error in the position of one of many marks on a record made of drill string penetration and since it is the overall pattern of such marks that is of interest, such adjustment is not necessary.) The second number of depth indicator signals, to be entered into the second counter 308, is then the difference between the total number of unit penetration distances in the length of one drill pipe segment and the selected first number of depth indicator signals entered into the first counter 306. These two numbers are manually entered into the first and second counters 306, 308.

Just prior to the commencement of drilling; that is, while the first of a series of drill pipe segments is in position to be lowered into a well when drilling is commenced, the pneumatic control circuit 16 is placed in a condition to carry out the cyclic operation thereof that has been described above. For this purpose, the number the second counter 308 is set to count is momentarily set to zero so that the output port A thereof is internally connected to the supply port thereof with the result that the second pulse generator 336 resets the first counter 306 and the spool of the valve 314 is positioned to transmit the depth indicator signals to the first counter 306 as has been discussed above. It will be noted that such resetting of the first counter 306 exhausts the first input port 82 of the pneumatic cylinder 66 to position the friction wheel mount 32 adjacent the first end 36 of the base 28 of the friction wheel support assembly 14 so that the friction wheel 10 will be positioned to cause one revolution of the output shaft 158 of the transmission 138 for one unit of penetration depth while the cable 20 is payed out from the outermost lap thereof on the drum 12. The friction wheel 10 is then engaged with the side of the drum 22 by opening the switch 302 which transmits air to the pneumatic support bracket positioning cylinder 110 to pivot the friction wheel support bracket 98 toward the side of the drum 12. The apparatus of the present invention will now be in condition to provide one depth indicator signal for one unit of drill string penetration substantially without regard to the winding of the cable 20 on the drum 12, as will now be described.

As the drill string is lowered, the friction wheel 10 is caused to rotate via the engagement thereof with the side 22 of the drum 12 and such rotation causes a corresponding rotation of the output shaft 158 of the transmission 138 and the cam 210. For each revolution of the cam 210, the set switch 220 is opened once to provide a depth indicator signal which is transmitted to the recording mechanism 276, via conduit 290 (FIG. 12), for marking a chart on a recorder and, simultaneously, is transmitted to the first counter 306 via the conduits 324 and 328 and the first section 326 of the spool valve 314. Since, during the initial period of lowering of the drill string, a maximum length of cable is wound on the drum 12, cable will initially be paid out from the outermost lap of cable on the drum 12. Moreover, as noted above, during counting by the first counter 306, the output port A thereof is exhausted so that the input port 82 of the cylinder 66 will similarly be exhausted with the result that the spring 70 will position the friction wheel mount 32 adjacent the first end 36 of the base 28 of the friction wheel support assembly 14. Accordingly, because of the positioning of the friction wheel 10 by the first adjustment screw 62, each revolution of the cam will correspond to one unit of penetration depth so that consecutive depth indicator signals will each correspond to the lowering of the drill string by one unit distance of penetration.

At some point in the lowering of the drill string within the range of drum positions in which the cable passes from being wrapped on the drum 12 in the outermost lap to being wrapped on the drum 12 in a lap adjacent thereto, the set switch 220 will transmit to the first counter 306 a depth indicator signal that will complete the series of such signals equal in number to the first preselected number entered into the first counter 306. With the reception of this pulse, the output port A of the first counter 306 becomes internally connected to the supply port P thereof to transmit pneumatic pressure to the first pulse generator 334, the spool valve 314 and the first input port of the cylinder 66. Thus, as described above, the first pulse generator 334 resets the second counter 308 to count subsequent depth indicator signals, the spool of the valve 314 is shifted to transmit subsequent depth indicator signals to the second counter 308 and the cylinder 66 shifts the friction wheel mount 32 radially inwardly of the drum 12 a distance which will maintain the relationship of one revolution of the output shaft 158 of transmission 138, and cam 210, for one unit of penetration of the drill string while cable is unwrapped from the lap on the drum 12 adjacent the outermost lap. Thus, subsequent depth indicator signals will again each mark an additional lowering of the drill string by one unit of penetration distance.

At such subsequent time that the drill string has been lowered through a total distance substantially equal to the nominal length of one drill pipe segment; that is, at such time that one drilling cycle defined by the lowering of the drill pipe segment is substantially completed, the set switch 220 transmits to the second counter a depth indicator signal that will complete the series of signals equal in number to the preselected second number entered into the second counter 308 so that the output port A thereof, will be internally connected with the supply port P thereof to place the signal production assembly 18 in condition for the next cycle of drilling in which an additional segment of drill pipe will be lowered into the well.

At the completion of each cycle of drilling, the drilling swivel will be detached from the drill string, as described above, for the addition of a new segment of pipe to the drill string and, in order to prevent the generation of depth indicator signals while the drilling swivel is raised for the addition of the new pipe segment, the friction wheel 10 is disengaged from the side 22 of the drum 12 by closing the switch 302 to exhaust the cylinder 110 on the friction wheel mount 32 so that the spring 106 can pivot the friction wheel support bracket 98 away from the drum 12. As is known in the art, it will, at times, also be necessary to interrupt drilling during the lowering of a segment and, at such times, the drill string may undergo successive raising and lowering. Should this occur, the switch 302 also provides a means of eliminating the generation of spurious depth indicator signals which would be related to movement of the drill string not associated with drilling of the well. That is, the switch 302 is closed to disengage the friction wheel 10 from the drum 12 during the interruption and opened, to reengage the friction wheel 10 with the drum 12, when drilling resumes.

It will be noted that a record made of penetration of the drill string, where the mechanism 276 is the equivalent of the control circuit described in my U.S. Pat. No. 4,099,410, will group marks made thereon into drilling cycles by the recording of down time as discussed above. Such grouping provides an indicator of a recording error that can occur when the length of a drill pipe segment added to the drill string at the beginning of a drilling cycle differs from the nominal length of such segments in that the number of marks in the group, if the length difference is significant, will differ from the number of unit penetration distances in the nominal length of the drill pipe segments. When this is the case, a depth indicator signal may be supplied to the first pneumatic counter 306 at the end of a drilling cycle or the depth indicator signal that completes the count for which the second pneumatic counter 308 is set may not occur until a subsequent cycle. This miscount will result in the friction wheel mount 32 being shifted for an inappropriate position of the drum 12 in the next drilling cycle so that more than one of the marks made on the record will be erroneously placed. In most cases, it will suffice to merely note such error and disregard several marks near the center of the group corresponding to such subsequent drilling cycle in interpreting the record.

Alternatively, the second pneumatic counter 308 can be momentarily set to zero at the beginning of such subsequent drilling cycle to eliminate the effect of the miscount. That is, the pneumatic control circuit 16 is placed in the same state, at the beginning of such subsequent drilling cycle, in which it was initially placed prior to commencement of drilling as has been described above.

As is also known in the art, it is common practice to increase the number of loops of cable between the crown block and drilling swivel as the well extends to greater and greater depths. When such a change is made, the gear 184 of the transmission 138 is advanced to engage a new one of the gears 200-208 of the transmission 138 so that the relationship of one revolution of the output shaft 158 of the transmission 138, in the cam 210, for one unit distance of drill string penetration will be maintained. Specifically, for each added loop, the gear 184 is advanced to mesh with one larger gear in the stepped series 200-208. The addition of a loop will also change the selected first and second numbers to be entered into the first and second counters 306, 308, because of the length of cable required to form the additional loop, and these numbers are redetermined, as described above, and entered into the counters 306, 308 prior to resuming drilling operations after the number of loops of the cable 20 between the crown block and drilling swivel has been made.

DESCRIPTION OF FIG. 13

Figure 13:
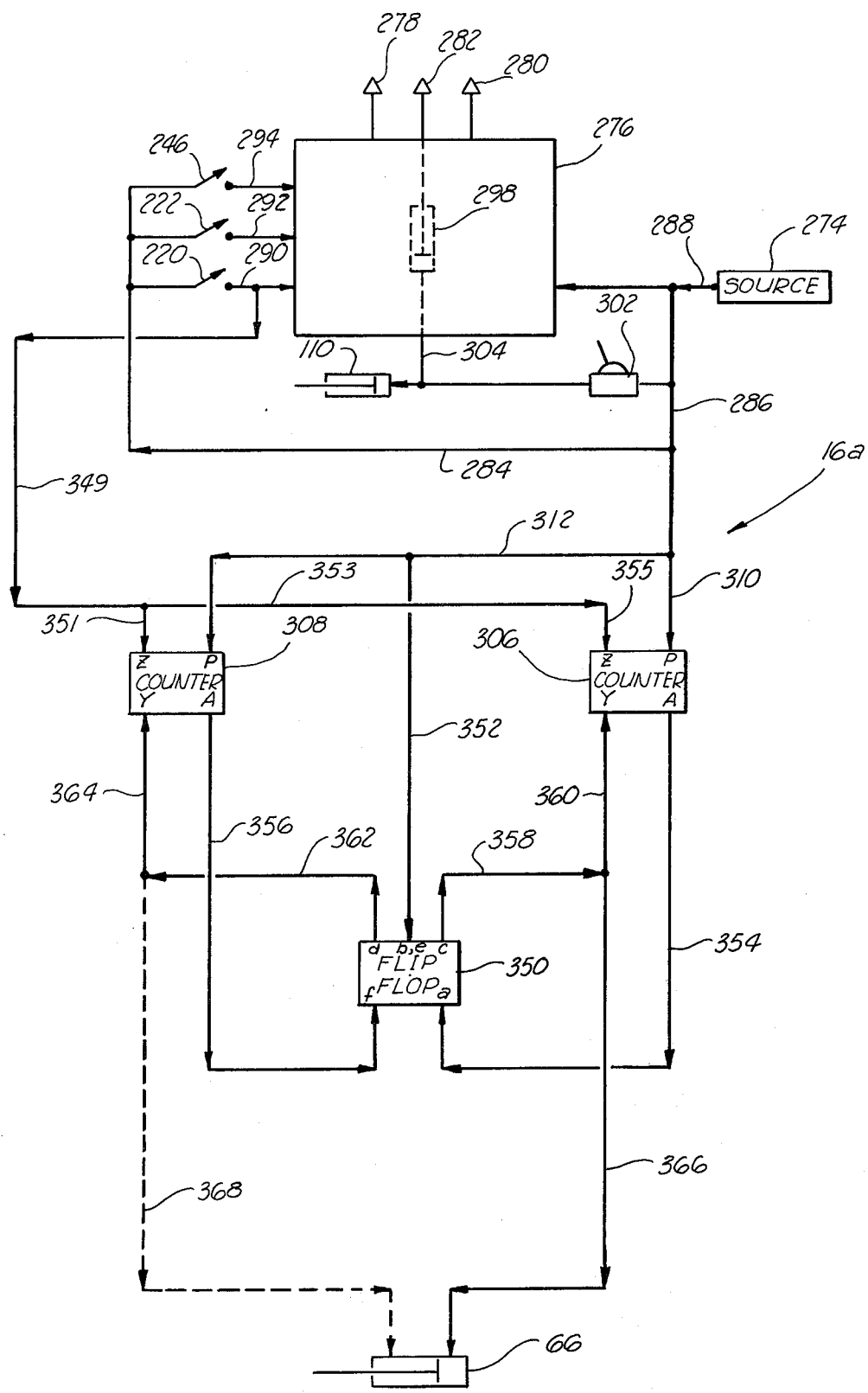
FIG. 13 is a schematic circuit diagram for a second embodiment of the pneumatic control circuit.

FIG. 13 shows a second embodiment, designated 16a of the pneumatic control circuit of the present invention. Like the pneumatic control circuit 16, the pneumatic control circuit 16a is used with a recording mechanism such as that disclosed in my U.S. Pat. No. 4,099,410 and is connected thereto in the same manner that the pneumatic control circuit 16 is connected thereto. As in FIG. 12, such recording mechanism has been indicated schematically and designated by the numeral 276 in FIG. 13. Similarly, the source of pneumatic pressure, switches and pneumatic cylinders shown in FIG. 12 have been schematically illustrated in FIG. 13 and given the same numerical designations as have been used in FIG. 12.

Like the pneumatic control circuit 16, the pneumatic control circuit 16a includes the two counters 306 and 308 and these are connected to the source 274 of pneumatic pressure in the same manner that such counters are connected to the source 274 in the pneumatic control circuit 16. However, remaining components of the pneumatic control circuit 16a differ from components of the pneumatic control circuit 16 and such difference is reflected both in the manner that the counters 306 and 308 are connected to the set switch 220 to receive the depth indicator signals therefrom and the manner in which pneumatic pressure is supplied to the pneumatic actuating cylinder 66 to shift the friction wheel mount 32 on the base 28 of the friction wheel support assembly 14 as will now be described. A characteristic of the model 59802 counters used in the present invention is that such counters reset on the upgoing edges of the pneumatic reset signals applied to the reset inputs Y thereof and are disabled from counting so long as the reset signals remain imposed on the reset inputs. That is, the output ports A of these counters are internally disconnected from the supply ports P thereof very shortly after pressure is applied to the reset ports Y, so that the output ports A are exhausted very shortly after such pressure application, and pulses applied to the count ports Z have no effect on the counters so long as pressure remains at the reset ports Y. This characteristic of the counters used for the counters 306 and 308 have been exploited in the pneumatic control circuit 16a. In particular, such characteristic eliminates the need for directing selected ones of the depth indicator signals to the counter 306 and others of the depth indicator signals to the counter 308 as will be discussed below. In the pneumatic control circuit 16a, the input ports Z of both counters 306, 308 are directly connected to the set switch 220 via conduits 349, 351, 353, and 355.

The pneumatic control circuit 16a comprises, in addition to the counters 306 and 308, a flip-flop 350 which can conveniently be a model 59180 pneumatic flip-flop manufactured by the aforementioned Aro Corporation of Bryan, Ohio and the manufacturer's letter designations indicating ports of the flip-flop 350 have been entered on FIG. 13 in the same manner that the manufacturer's letter designations have been used to indicate ports of the counters 306 and 308 in FIGS. 12 and 13. In particular, the flip-flop 350 has a supply port indicated at b, e and the supply port is connected to the source 274 of pneumatic pressure via a conduit 352 and the conduits 312, 286 and 288. The flip-flop 350 further has a set input port a, which is connected to the output port A of counter 306 via a conduit 354, and a reset input port f which is similarly connected to the output port A of counter 308 via a conduit 356. In addition to these input ports, the flip-flop 350 has a set output port c, which is connected to the reset port Y of the counter 306 via conduits 358 and 360, and a reset output port d, which is similarly connected to the reset port Y of the counter 308 via conduits 362 and 364. The operation of the flip-flop 350 is conventional; that is, the flip-flop 350 will respond to a pneumatic pulse at the set input port a thereof to internally connect the set output port c thereof to the supply port b, e while exhausting the reset output port d and will respond to a pneumatic pulse at the reset input port f thereof to internally connect the reset output port d thereof to the supply port b, e while exhausting the set output port c.

When the shift assembly of the present invention includes the pneumatic control circuit 16a rather than the pneumatic control circuit 16, pneumatic pressure supplied by the flip-flop 350, rather than by the counter 306 (or both counters 306, 308) is used to shift the friction wheel mount 32 on the base 28 of the friction wheel support assembly 14 and, for this purpose, the set output port c of the flip-flop 350 is connected to the first input port 82 of the pneumatic actuating cylinder 66 via the conduit 358 and a conduit 366 as indicated in FIG. 13. Thus, at such times that the flip-flop 350 makes a transition to the set state thereof, wherein the set output port c thereof is internally connected to the supply port b, e, from the reset state thereof, wherein the set output port c thereof is exhausted, pneumatic pressure will be transmitted to the first input port 82 of the pneumatic actuating cylinder 66 to shift the friction wheel mount 32 toward the second end 38 of the base 28 of the friction wheel support assembly 14. Conversely, when the flip-flop 350 makes a transition to the reset state thereof from the set state thereof, the first input port 82 of the cylinder 66 is exhausted so that the spring 70 (FIG. 5) can shift the friction wheel mount 32 back toward the first end 36 of the base 28. As in the case in which the pneumatic control circuit 16 is used for shifting the friction wheel mount 32, it is contemplated that the return of the friction wheel mount 32 toward the first end 36 of the base 28 can be carried out by pneumatic pressure supplied by the pneumatic control circuit 16a rather than by the spring 70. For such return of the friction wheel mount 32, the reset output port d of the flip-flop 350 is connected to the second input port 84 of the pneumatic actuating cylinder 66 via the conduit 362 and a conduit 368 which has been indicated in dashed lines in FIG. 13.

Similarly, as is the case for the pneumatic control circuit 16, the operation of the pneumatic control circuit 16a is cyclic with the result that a series of pressure signals is supplied to the pneumatic cylinder 66 as the set switch 220 repeatedly supplies depth indicator signals to cause the cylinder 66 to repetitively shift the friction wheel mount 32 away from the first end 36 of the base 28 and then return the friction wheel mount 32 to a position adjacent such first end 36 so that the present invention will operate in the same manner as that described above for the case in which the pneumatic control circuit 16 is incorporated into the shift assembly of the present invention. Accordingly, such operation need not be repeated; rather, it will suffice for purposes of the present disclosure to describe the cyclic operation of the pneumatic control circuit 16a.

As noted above, the input ports Z of both counters 306, 308 are directly connected to the set switch 220 so that both counters receive all depth indicator signals produced by the set switch 220. However, since the counters 306, 308 are disabled from counting by pneumatic pressure at the reset ports Y thereof, and since one of the output ports c or d of the flip-flop 350, which are connected to the reset ports Y of the counters 306 and 308, will be internally connected in the flip-flop 350 to the supply port b, e thereof, only one counter 306 or 308 will respond to each depth indicator signal and such selected response is utilized to cause the pneumatic control circuit 16a to carry out series of cycles of operation as will now be discussed. For purposes of discussion, it will be considered that preselected numbers have been entered into the counters 306 and 308 as in the case where the counters 306 and 308 form a part of the pneumatic control circuit 16 and that the flip-flop 350 has just undergone a transition to the reset state thereof from the set state thereof. Thus, at the commencement of the cycle, the counter 306 is in a condition to receive and count depth indicator signals while the counter 308 is receiving pneumatic pressure at the reset port Y thereof from the reset output port d of the flip-flop 350 and, accordingly, will not respond to the depth indicator signals. Since the flip-flop 350 will previously have been in a set state, the output port A of the counter 306 will be exhausted and, as the flip-flop 350 goes to the reset state, pressure is supplied to the reset port Y of the counter 308 to similarly exhaust the output port A of the counter 308. Thus, following the transition to the reset state of the flip-flop 350, the input ports a and f thereof, which are connected to the output ports A of the counters 306 and 308 respectively, will be exhausted.

As the generation of depth indicator signals by the set switch 220 and the transmission of such signals to the first pneumatic counter 306 proceeds, such counter 306 will count the signals until the number of signals received reaches the preselected number entered into the counter 306. At this point, the counter 306 will operate to internally connect the output port A thereof to the supply port P thereof so that pneumatic pressure is transmitted to the set input port a of the flip-flop 350 to set the flip-flop 350 and thereby remove pneumatic pressure from the reset port Y of the second pneumatic counter 308 so that the second pneumatic counter 308 becomes responsive to the depth indicator signals. Concurrently, the flip-flop 350 will transmit pneumatic pressure to the reset port Y of the first pneumatic counter 306 so that the output port A of the first pneumatic counter 306 is exhausted and so that the first pneumatic counter 306 becomes non-responsive to the depth indicator signals. Thus, following the transition of the flip-flop 350 to the set state thereof, both inputs a and f of the flip-flop 350 are exhausted and subsequent depth indicator signals will be counted only by the second pneumatic counter 308. It will also be noted that the transition of the flip-flop 350 to the set state thereof will result in the transmission of pneumatic pressure to the first input port 82 of the pneumatic actuating cylinder 66, via the conduits 358 and 366, so that the friction wheel mount 32 will be shifted away from the first end of the base 28 of the friction wheel support assembly 14.

As the generation of depth indicator signals by the set switch 220 and the transmission of such signals to the pneumatic control circuit 16a continues, the second pneumatic counter 308 will count such signals until the number of such signals reaches the preselected number entered into the counter 308. At this point, the output port A of the counter 308 will be connected to the supply port P thereof to provide pneumatic pressure to the reset input port f of the flip-flop 350 so as to cause a transition of the flip-flop 350 to the reset state thereof, thereby completing the cycle. It will be noted, that such transition will exhaust the set output port c of the flip-flop 350 to remove pneumatic pressure from the first input port 82 of the pneumatic actuating cylinder 66. Accordingly, the spring 70, or pneumatic pressure supplied to the second input port 84 of the pneumatic actuating cylinder 66 via the conduits 368 and 362 leading therefrom to the reset output ports d of the flip-flop 350, will return the friction wheel mount 32 to a position adjacent the first end 36 of the base 28 of the friction wheel support assembly 14.

As in the case in which the present invention incorporates the pneumatic control circuit 16, the number entered into the first pneumatic counter 306 of the pneumatic control circuit 16a will be the number of units of distance that the drill string will be lowered as the outermost lap of cable is paid off the drum 12 and the number entered into the second pneumatic counter 308 will be the nominal length of a pipe segment less the number entered into the first pneumatic counter 306. Similarly, prior to commencement of drilling operations, the second pneumatic counter 308 is momentarily set to zero, to place the flip-flop 350 in the reset state thereof so that, initially, the first input port 82 of the pneumatic actuating cylinder 66 will be exhausted while the cable is paid off the outermost lap of the drum 12 as described above for the case in which the present invention includes the pneumatic control circuit 16. During such paying out of cable from the outermost lap on the drum 12, the depth indicator signals produced by the set switch 220 will be counted by the first pneumatic counter 306 so that the system operates in the same manner as has been described above for the case in which the pneumatic control circuit is the pneumatic control circuit 16.

It is clear that the present invention is well adapted to carry out the objects and obtain the ends and advantages mentioned as those inherent therein. While presently preferred embodiments of the invention have been described for purposes of the disclosure, numerous changes may be made which will readily suggest themselves to those skilled in the art and which are encompassed within the spirit of the invention disclosed and as defined in the appended claims.

What is claimed is:

1. An apparatus for generating depth indicator signals indicative of the depth of penetration of a drill string which is lowered by a cable wound on a drum, comprising:

a friction wheel positioned adjacent one side of the drum and engageable therewith so as to be turned by the drum as the drum is turned to lower the drill string;

means for selectively engaging the friction wheel with the side of the drum;

signal production means, connected to the friction wheel, for producing a depth indicator signal each time the friction wheel is turned through a preselected angle of rotation; and shift means, supporting the friction wheel for movement substantially radially of the drum and connected to the signal production means so as to receive the depth indicator signals produced thereby, for cyclically shifting the friction wheel a preselected distance toward the axis of the drum in response to reception by the shift means of a preselected first number of depth indicator signals and shifting the friction wheel an equal distance away from the axis of the drum in response to reception by the shift means of an additional preselected second number of depth indicator signals.

2. The apparatus of claim 1 wherein the signal production means comprises:

a variable ratio transmission having an input shaft and an output shaft, said input shaft being mechanically coupled to the friction wheel for rotation of the input shaft by the friction wheel; and switch means operable by the output shaft of said transmission for generating a depth indicator signal for each revolution of said output shaft.

3. The apparatus of claim 2 wherein the switch means comprises:

a cam mounted on the output shaft of said transmission; and at least one pneumatic switch engaging said cam for actuation thereby as the cam rotates through one revolution.

4. The apparatus of claim 1 wherein the shift means comprises:

a base positioned adjacent said one side of the drum, the base having opposed first and second ends disposed generally along a line extending radially of the drum;

a friction wheel mount rotatably supporting the friction wheel and slidably supported on the base for longitudinal movement on the base;

means for urging the friction wheel mount toward one end of the base;

a pneumatic actuating cylinder connected between the base and the friction wheel mount so as to urge the friction wheel mount toward the other end of the base in response to pneumatic pressure supplied to the pneumatic actuating cylinder; and pneumatic control means operably interposed between the signal production means and the pneumatic actuating cylinder for cyclically supplying pneumatic pressure to the pneumatic actuation cylinder in response to reception of said first number of depth indicator signals by the pneumatic control means and releasing such pneumatic pressure in response to the subsequent reception by the pneumatic control means of said second number of depth indicator signals.

5. The apparatus of claim 4 wherein said apparatus is characterized as comprising a source of pneumatic pressure; wherein the signal production means is characterized as comprising means, connected to said source of pneumatic pressure, for providing the depth indicator signals in the form of pneumatic pulses derived from said source of pneumatic pressure; and wherein the pneumatic control means comprises:

a first pneumatic counter having a supply port connected to the source of pneumatic pressure, a count port, a reset port, and an output port, said first pneumatic counter being of the type having a normally exhausted output port and operable to transmit pneumatic pressure from the supply port thereof to the output port thereof in response to reception by the first pneumatic counter of a pneumatic pulse at the reset port thereof followed by a series of pneumatic pulses, equal in number to said preselected first number of depth indicator signals, supplied to the count port of the first pneumatic counter;

a second pneumatic counter having a supply port connected to the source of pneumatic pressure, a count port, a reset port, and an output port, said second pneumatic counter being of the type having a normally exhausted output port and operable to transmit pneumatic pressure from the supply port thereof to the output port thereof in response to reception by the second pneumatic counter of a pneumatic pulse at the reset port thereof followed by a series of pneumatic pulses, equal in number to said preselected second number of depth indicator signals, supplied to the count port of the second pneumatic counter;

a first pulse generator, connected between the output port of the first pneumatic counter and the reset port of the second pneumatic counter, for transmitting a pneumatic pulse to the reset port of the second pneumatic counter in response to the appearance of pneumatic pressure at the output port of the first pneumatic counter;

a second pulse generator, connected between the output port of the second pneumatic counter and the reset port of the first pneumatic counter, for transmitting a pneumatic pulse to the reset port of the first pneumatic counter in response to the appearance of pneumatic pressure at the output port of the second pneumatic counter; and valve means, connecting the signal production means to the count ports of the pneumatic counters, for selectively transmitting pulses provided by the signal production means to one of the pneumatic counters, wherein the valve means is connected to the output ports of both pneumatic counters so as to be responsive to pneumatic pressure at the output port of the first pneumatic counter to transmit the pulses provided by the signal production means to the count port of the second pneumatic counter and so as to be responsive to pneumatic pressure at the output port of the second pneumatic counter to transmit the pulses provided by the signal production means to the count port of the first pneumatic counter; and wherein the pneumatic actuating cylinder is connected to the output port of the first pneumatic counter, whereby pneumatic pressure is supplied to the pneumatic actuating cylinder at such times that the first pneumatic counter is in a state wherein pneumatic pressure at the supply port thereof is transmitted to the output port thereof.

6. The apparatus of claim 4 wherein said apparatus is characterized as comprising a source of pneumatic pressure; wherein the signal production means is characterized as comprising means, connected to said source of pneumatic pressure, for providing the depth indicator signals in the form of pneumatic pulses derived from said source of pneumatic pressures; and wherein the pneumatic control means comprises:

a first pneumatic counter having a supply port connected to the source of pneumatic pressure, a count port connected to the signal production means so as to receive the depth indicator signals, a reset port and an output port, wherein the first pneumatic counter is characterized as being of the type having a normally exhausted output port and is operable to transmit pneumatic pressure from the supply port thereof to the output port thereof in response to reception thereby of a series of pneumatic pulses, equal in number to said preselected first number of depth indicator signals, supplied to the count port thereof following reception thereby of a pneumatic pulse at the reset port thereof, wherein the first pneumatic counter is further characterized as being of the type which will undergo a transition from a state wherein the output port is connected to the supply port to the normally exhausted output port state thereof in response to the upgoing edge of said pneumatic pulse received at the reset port thereof, and wherein the first pneumatic counter is further characterized as being of the type which is non-responsive to pulses received at the input port thereof at such times that pneumatic pressure is received thereby at the reset port thereof;

a second pneumatic counter having a supply port connected to the source of pneumatic pressure, a count port connected to the signal production means so as to receive the depth indicator signals, a reset port and an output port, wherein the second pneumatic counter is characterized as being of the type having a normally exhausted output port and is operable to transmit pneumatic pressure from the supply port thereof to the output port thereof in response to reception thereby of a series of pneumatic pulses, equal in number to said preselected second number of depth indicator signals, supplied to the count port thereof following reception thereby of a pneumatic pulse at the reset port thereof, wherein the second pneumatic counter is further characterized as being of the type which will undergo a transition from a state wherein the output port is connected to the supply port to the normally exhausted output port state thereof in response to the upgoing edge of said pneumatic pulse received at the reset port thereof, and wherein the second pneumatic counter is further characterized as being of the type which is non-responsive to pulses received at the input port thereof at such times that pneumatic pressure is received thereby at the reset port thereof; and a pneumatic flip-flop having a supply port connected to the source of pneumatic pressure, a set input port connected to the output port of the first pneumatic counter, a reset input port connected to the output port of the second pneumatic counter, a set output port connected to the reset port of the first pneumatic counter, and a reset output port connected to the reset port of the second pneumatic counter, wherein the flip-flop is characterized as being of the type operable in response to pneumatic pressure applied to the set input port thereof to transmit pneumatic pressure at the supply port thereof to the set output port thereof while exhausting the reset output port thereof and operable in response to pneumatic pressure applied to the reset input port thereof to transmit pneumatic pressure at the supply port thereof to the reset output port thereof while exhausting the set output port thereof; and wherein the pneumatic actuating cylinder is connected to the set output port of the flip-flop.

7. The apparatus of claim 1 wherein the shift means comprises:

a base positioned adjacent said one side of the drum, the base having opposed first and second ends disposed generally along a line extending radially of the drum;

a friction wheel mount rotatably supporting the friction wheel and slidably supported on the base for longitudinal movement on the base;

a pneumatic actuating cylinder connected between the base and the friction wheel mount so as to urge the friction wheel mount toward one end of the base in response to pneumatic pressure supplied to a first input port of the pneumatic actuating cylinder and so as to urge the friction wheel mount toward the other end of the base in response to pneumatic pressure supplied to a second input port of the pneumatic actuating cylinder; and pneumatic control means operably interposed between the signal production means and the pneumatic actuating cylinder for cyclically supplying pneumatic pressure to the first input port of the pneumatic actuation cylinder in response to reception of said first number of depth indicator signals by the pneumatic control means and supplying pneumatic pressure to the second input port of the pneumatic actuating cylinder in response to the subsequent reception by the pneumatic control means of said second number of depth indicator signals.

8. The apparatus of claim 7 wherein said apparatus is characterized as comprising a source of pneumatic pressure; wherein the signal production means is characterized as comprising means, connected to said source of pneumatic pressure, for providing the depth indicator signals in the form of pneumatic pulses derived from said source of pneumatic pressure; and wherein the pneumatic control means comprises:

a first pneumatic counter having a supply port connected to the source of pneumatic pressure, a count port, a reset port, and an output port, said first pneumatic counter being of the type having a normally exhausted output port and operable to transmit pneumatic pressure from the supply port thereof to the output port thereof in response to reception by the first pneumatic counter of a pneumatic pulse at the reset port thereof followed by a series of pneumatic pulses, equal in number to said preselected first number of depth indicator signals, supplied to the count port of the first pneumatic counter;

a second pneumatic counter having a supply port connected to the source of pneumatic pressure, a count port, a reset port, and an output port, said second pneumatic counter being of the type having a normally exhausted output port and operable to transmit pneumatic pressure from the supply port thereof to the output port thereof in response to reception by the second pneumatic counter of a pneumatic pulse at the reset port thereof followed by a series of pneumatic pulses, equal in number to said preselected second number of depth indicator signals, supplied to the count port of the second pneumatic counter;

a first pulse generator, connected between the output port of the first pneumatic counter and the reset port of the second pneumatic counter, for transmitting a pneumatic pulse to the reset port of the second pneumatic counter in response to the appearance of pneumatic pressure at the output port of the first pneumatic counter;

a second pulse generator, connected between the output port of the second pneumatic counter and the reset port of the first pneumatic counter, for transmitting a pneumatic pulse to the reset port of the first pneumatic counter in response to the appearance of pneumatic pressure at the output port of the second pneumatic counter; and valve means, connecting the signal production means to the count ports of the pneumatic counters, for selectively transmitting pulses provided by the signal production means to one of the pneumatic counters, wherein the valve means is connected to the output ports of both pneumatic counters so as to be responsive to pneumatic pressure at the output port of the first pneumatic counter to transmit the pulses provided by the signal production means to the count port of the second pneumatic counter and so as to be responsive to pneumatic pressure at the output port of the second pneumatic counter to transmit the pulses provided by the signal production means to the count port of the first pneumatic counter; and wherein the first input port of the pneumatic actuating cylinder is connected to the output port of the first pneumatic counter, and wherein the second input port of the pneumatic actuating cylinder is connected to the output port of the second pneumatic counter.

9. The apparatus of claim 7 wherein said apparatus is characterized as comprising a source of pneumatic pressure; wherein the signal production means is characterized as comprising means, connected to said source of pneumatic pressure, for providing the depth indicator signals in the form of pneumatic pulses derived from said source of pneumatic pressures; and wherein the pneumatic control means comprises:

a first pneumatic counter having a supply port connected to the source of pneumatic pressure, a count port connected to the signal production means so as to receive the depth indicator signals, a reset port and an output port, wherein the first pneumatic counter is characterized as being of the type having a normally exhausted output port and is operable to transmit pneumatic pressure from the supply port thereof to the output port thereof in response to reception thereby of a series of pneumatic pulses, equal in number to said preselected first number of depth indicator signals, supplied to the count port thereof following reception thereby of a pneumatic pulse at the reset port thereof, wherein the first pneumatic counter is further characterized as being of the type which will undergo a transition from a state wherein the output port is connected to the supply port to the normally exhausted output port state thereof in response to the upgoing edge of said pneumatic pulse received at the reset port thereof, and wherein the first pneumatic counter is further characterized as being of the type which is non-responsive to pulses received at the input port thereof at such times that pneumatic pressure is received thereby at the reset port thereof;

a second pneumatic counter having a supply port connected to the source of pneumatic pressure, a count port connected to the signal production means so as to receive the depth indicator signals, a reset port and an output port, wherein the second pneumatic counter is characterized as being of the type having a normally exhausted output port and is operable to transmit pneumatic pressure from the support port thereof to the output port thereof in response to reception thereby of a series of pneumatic pulses, equal in number to said preselected second number of depth indicator signals, supplied to the count port thereof following reception thereby of a pneumatic pulse at the reset port thereof, wherein the second pneumatic counter is further characterized as being of the type which will undergo a transition from a state wherein the output port is connected to the supply port to the normally exhausted output port state thereof in response to the upgoing edge of said pneumatic pulse received at the reset port thereof, and wherein the second pneumatic counter is further characterized as being of the type which is non-responsive to pulses received at the input port thereof at such times that pneumatic pressure is received thereby at the reset port thereof; and a pneumatic flip-flop having a supply port connected to the source of pneumatic pressure, a set input port connected to the output port of the first pneumatic counter, a reset input port connected to the output port of the second pneumatic counter, a set output port connected to the reset port of the first pneumatic counter, and a reset output port connected to the reset port of the second pneumatic counter, wherein the flip-flop is characterized as being of the type operable in response to pneumatic pressure applied to the set input port thereof to transmit pneumatic pressure at the supply port thereof to the set output port thereof while exhausting the reset output port thereof and operable in response to pneumatic pressure applied to the reset input port thereof to transmit pneumatic pressure at the supply port thereof to the reset output port thereof while exhausting the set output port thereof; and wherein the first input port of the pneumatic actuating cylinder is connected to the set output port of the flip-flop and the second input port of the pneumatic actuating cylinder is connected to the reset output port of the flip-flop.

10. The apparatus of claim 4 or claim 7 wherein said apparatus is characterized as comprising a source of pneumatic pressure; wherein the friction wheel mount comprises:
- a slide mounted on said base for sliding movement thereon; and
- a friction wheel support bracket whereon the friction wheel is mounted, the friction wheel support bracket pivotally mounted on said slide for pivotation toward the side of said drum so as to engage the friction wheel with the drum and away from the side of said drum to disengage the friction wheel from said drum; and wherein the means for selectively engaging the friction wheel with the side of the drum is characterized as comprising:
- a spring connected between the slide and the friction wheel support bracket so as to urge the friction wheel support bracket away from the side of the drum;
- a pneumatic support bracket positioning cylinder mounted on the slide and having a piston extensible in response to pneumatic pressure supplied at an input port of said pneumatic support bracket positioning cylinder to engage the friction wheel support bracket so as to pivot the friction wheel support bracket toward the side of the drum; and
- a pneumatic switch connected between the input port of the pneumatic support bracket positioning cylinder and the source of the pneumatic pressure.

11. The apparatus of claim 5, 6, 8 or 9 wherein the friction wheel mount comprises:
- a slide mounted on said base for sliding movement thereon; and
- a friction wheel support bracket whereon the friction wheel is mounted and the friction wheel support bracket pivotally mounted on said slide for pivotation toward the side of said drum so as to engage the friction wheel with the drum and away from the side of said drum to disengage the friction wheel from said drum; and wherein the means for selectively engaging the friction wheel with the side of the drum is characterized as comprising:
- a spring connected between the slide and the friction wheel support bracket so as to urge the friction wheel support bracket away from the side of the drum;
- a pneumatic support bracket positioning cylinder mounted on the slide and having a piston extensible in response to pneumatic pressure supplied at an input port of said pneumatic support bracket positioning cylinder to engage the friction wheel support bracket so as to pivot the friction wheel support bracket toward the side of the drum; and
- a pneumatic switch connected between the input port of the pneumatic support bracket positioning cylinder and the source of the pneumatic pressure.

* * * * *

UNITED STATES PATENT AND TRADEMARK OFFICE
CERTIFICATE OF CORRECTION

PATENT NO. : 4,389,885
DATED : June 28, 1983
INVENTOR(S) : T. Edward Martin

It is certified that error appears in the above—identified patent and that said Letters Patent is hereby corrected as shown below:

Column 13, line 14, "this" should be --This--.

Column 20, line 46, "cables" should be --cable--.

Column 26, line 3, "have" should be --has--.

Column 34, line 28, "support" should be --supply--.

Signed and Sealed this

Seventeenth Day of January 1984

[SEAL]

Attest:

GERALD J. MOSSINGHOFF

Attesting Officer

Commissioner of Patents and Trademarks